United States Patent
Nguyen et al.

(10) Patent No.: US 11,091,660 B2
(45) Date of Patent: Aug. 17, 2021

(54) USE OF A THERMOSETTING POLYMERIC POWDER COMPOSITION

(71) Applicant: TIGER COATINGS GMBH & CO. KG, Wels (AT)

(72) Inventors: Le-Huong Nguyen, Wels (AT); Carsten Herzhoff, Wels (AT); Bernhard Brüstle, Wels (AT); Gerhard Buchinger, Wels (AT)

(73) Assignee: TIGER COATINGS GMBH & CO. KG, Wels (AT)

( * ) Notice: Subject to any disclaimer, the term of this patent is extended or adjusted under 35 U.S.C. 154(b) by 163 days.

(21) Appl. No.: 16/302,406

(22) PCT Filed: Mar. 13, 2018

(86) PCT No.: PCT/EP2018/056251
§ 371 (c)(1),
(2) Date: Nov. 16, 2018

(87) PCT Pub. No.: WO2018/167067
PCT Pub. Date: Sep. 20, 2019

(65) Prior Publication Data
US 2019/0264048 A1      Aug. 29, 2019

(30) Foreign Application Priority Data

Mar. 13, 2017  (EP) .................................. 17160613

(51) Int. Cl.
| | |
|---|---|
| *B29C 64/141* | (2017.01) |
| *C09D 11/104* | (2014.01) |
| *B33Y 70/00* | (2020.01) |
| *C08L 63/00* | (2006.01) |
| *B29C 64/153* | (2017.01) |
| *B29K 67/00* | (2006.01) |

(52) U.S. Cl.
CPC ............ *C09D 11/104* (2013.01); *B33Y 70/00* (2014.12); *C08L 63/00* (2013.01); *B29C 64/153* (2017.08); *B29K 2067/00* (2013.01)

(58) Field of Classification Search
None
See application file for complete search history.

(56) References Cited

U.S. PATENT DOCUMENTS

| | | |
|---|---|---|
| 4,863,538 A | 9/1989 | Deckard |
| 4,944,817 A | 7/1990 | Bourell et al. |
| 5,017,753 A | 5/1991 | Deckard |
| 5,296,062 A | 3/1994 | Bourell et al. |
| 6,136,948 A | 10/2000 | Dickens, Jr. |
| 6,239,215 B1 * | 5/2001 | Morita ................... C09D 5/031 525/64 |
| 8,247,492 B2 | 8/2012 | Martinoni |
| 8,592,519 B2 | 11/2013 | Martinoni |
| 2004/0081573 A1 | 4/2004 | Newell |
| 2007/0126159 A1 | 6/2007 | Simon et al. |
| 2007/0241482 A1 | 10/2007 | Giller et al. |
| 2010/0160547 A1 | 6/2010 | Martinoni |
| 2014/0121327 A1 | 5/2014 | Schmidt et al. |
| 2017/0037256 A1 * | 2/2017 | Bongaerts ................ C08K 3/11 |

FOREIGN PATENT DOCUMENTS

| | | |
|---|---|---|
| DE | 19747309 | 4/1999 |
| DE | 10122492 | 11/2002 |
| EP | 0968080 | 6/2002 |
| EP | 2118169 | 7/2012 |
| JP | 2009-013395 | 1/2009 |
| WO | WO 2017/046132 | 3/1917 |
| WO | WO 1996/006881 | 3/1996 |
| WO | WO 2003/106146 | 12/2003 |
| WO | WO 2008/057844 | 5/2008 |
| WO | WO 2009/114715 | 9/2009 |

OTHER PUBLICATIONS

Abhinandan et al., "Laser curing of thermosetting powder coatings," Indian Institute of Technology, Laser Programme, Centre for Advanced Technology, 1995.
Abhinandan et al., "Laser curing of thermosetting powder coatings: A Detailed Investigation," *Journal of Laser Applications*, 1999, 11:148.
Compton et al., "3D-Printing of Lightweight Cellular Composites" *Advanced Materials*, 2014, 26(34):5930-5935.
International Search Report and Written Opinion issued in International Patent Application No. PCT/EP2018/056251, dated May 4, 2018.
Search Report issued in corresponding European Patent Application No. 17160613.0, dated Sep. 20, 2017.
Simone, Giuseppina "An experimental investigation on the laser cure of thermosetting powder: AN empirical model for the local coating," *Progress in Organic Coatings*, 2010, 68:340-346.

* cited by examiner

*Primary Examiner* — Michael J Feely
(74) *Attorney, Agent, or Firm* — Norton Rose Fulbright US LLP

(57) ABSTRACT

The present invention relates to the use of a thermosetting polymeric powder composition in a 3D printing process to produce a 3D duroplast, wherein the composition comprises at least one curable polymeric binder material and at least one thermoplast having a $T_g$ and/or $M_p$ below the temperature provided in a pass of the printing process and wherein during each pass of the printing process said polymeric binder material is at least partially cured within the layer thus formed and also at least partially crosslinked with the previous layer. The invention furthermore relates to a 3D printing process using such a thermosetting polymeric powder composition and a 3D-printing product obtained when using such a thermosetting polymeric powder composition.

14 Claims, 11 Drawing Sheets

Fig. 1 An example for interlayer-crosslinking of the powder during SLS
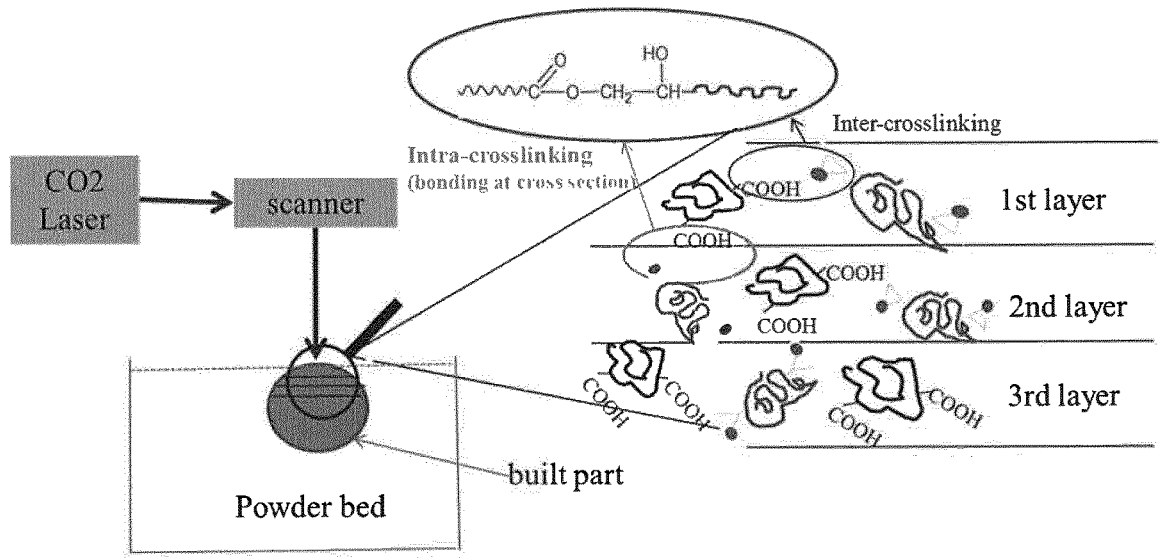
Fig. 2 An example of crosslinking network caused by the reaction between epoxy resin with amine
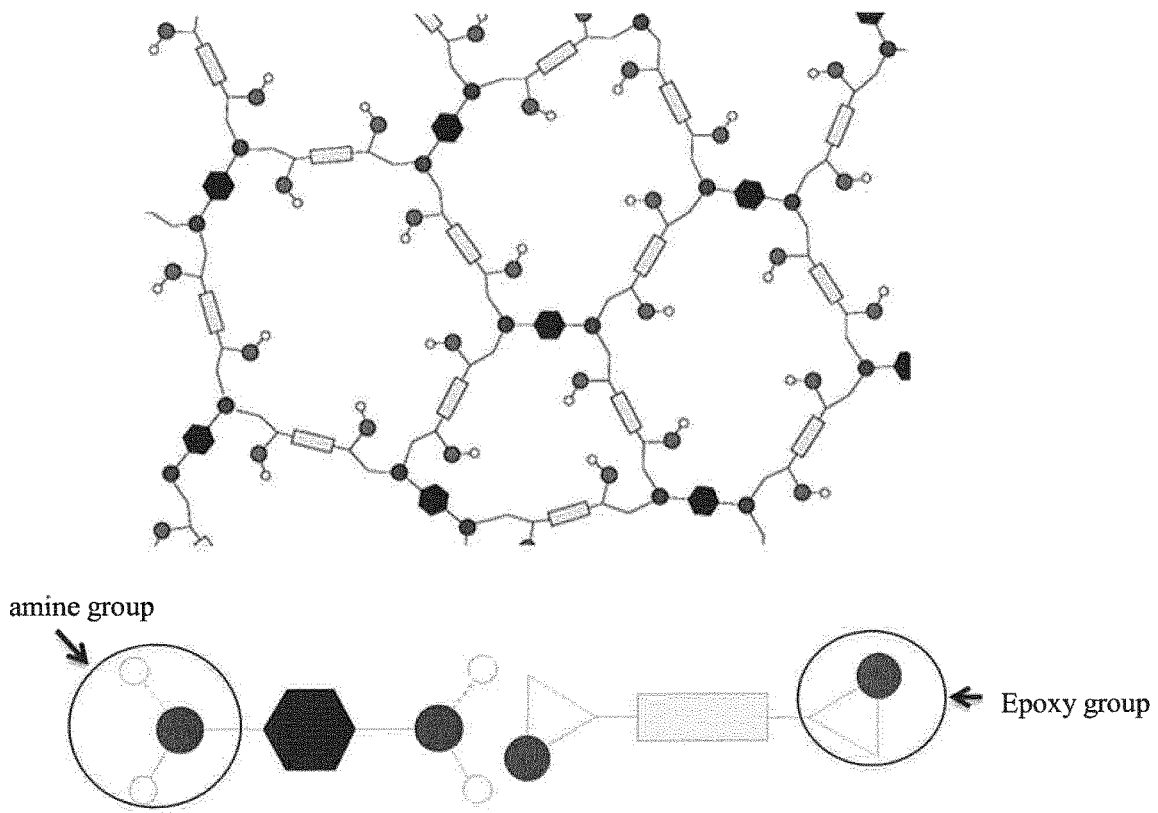

Fig. 3 Chemical structure of bisphenol A epoxy resin
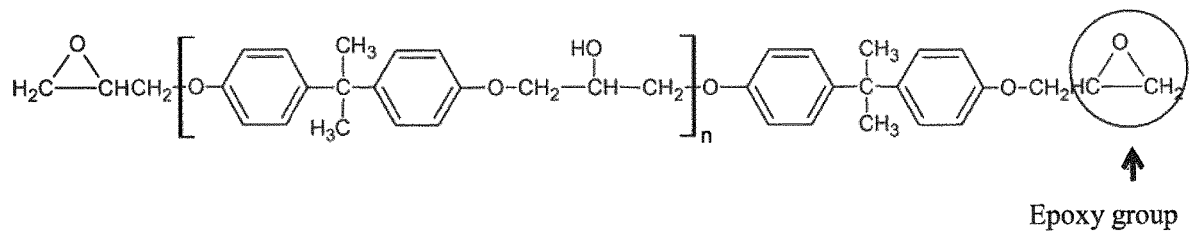
Epoxy group
Fig. 3a Epoxy resin cured with amine
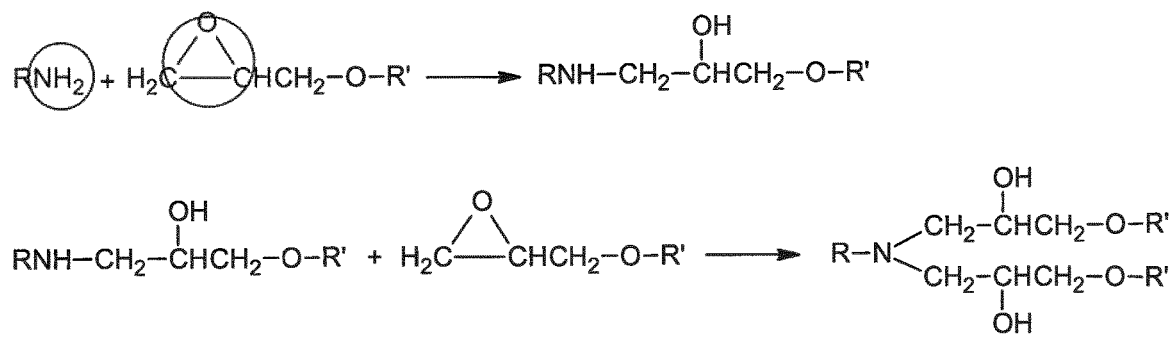
Fig. 3b Epoxy resin cured with acid anhydride
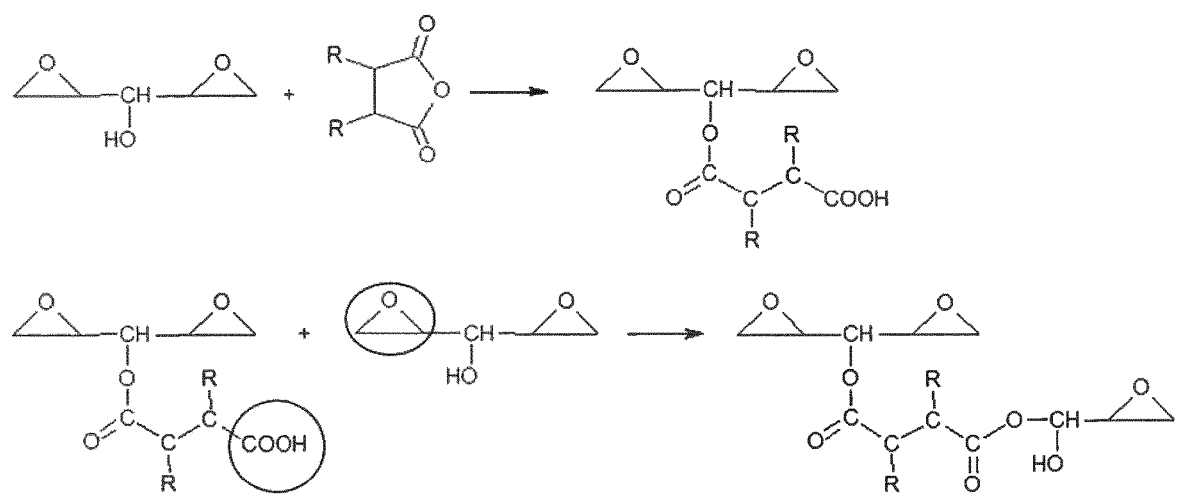

Fig. 4 Functional polyester resins
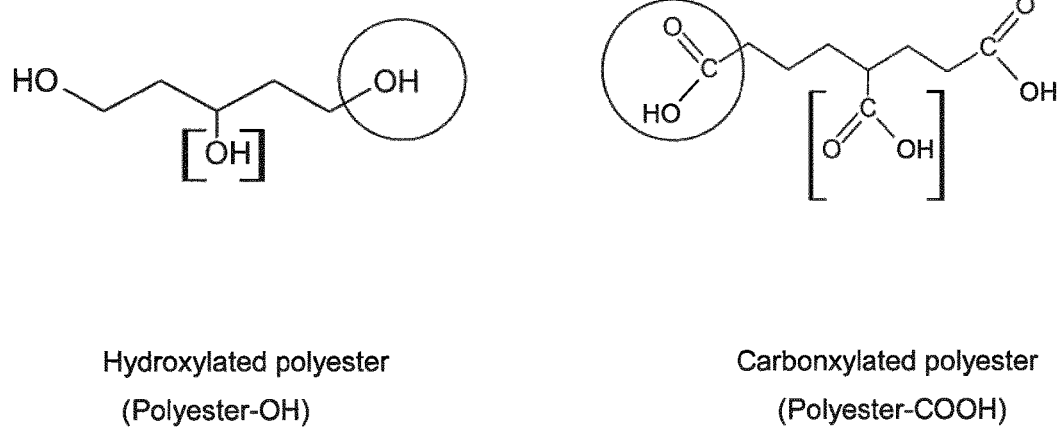
Hydroxylated polyester
(Polyester-OH)
Carbonxylated polyester
(Polyester-COOH)
Fig.4a Carboxylated Polyester (PE) cured with TGIC
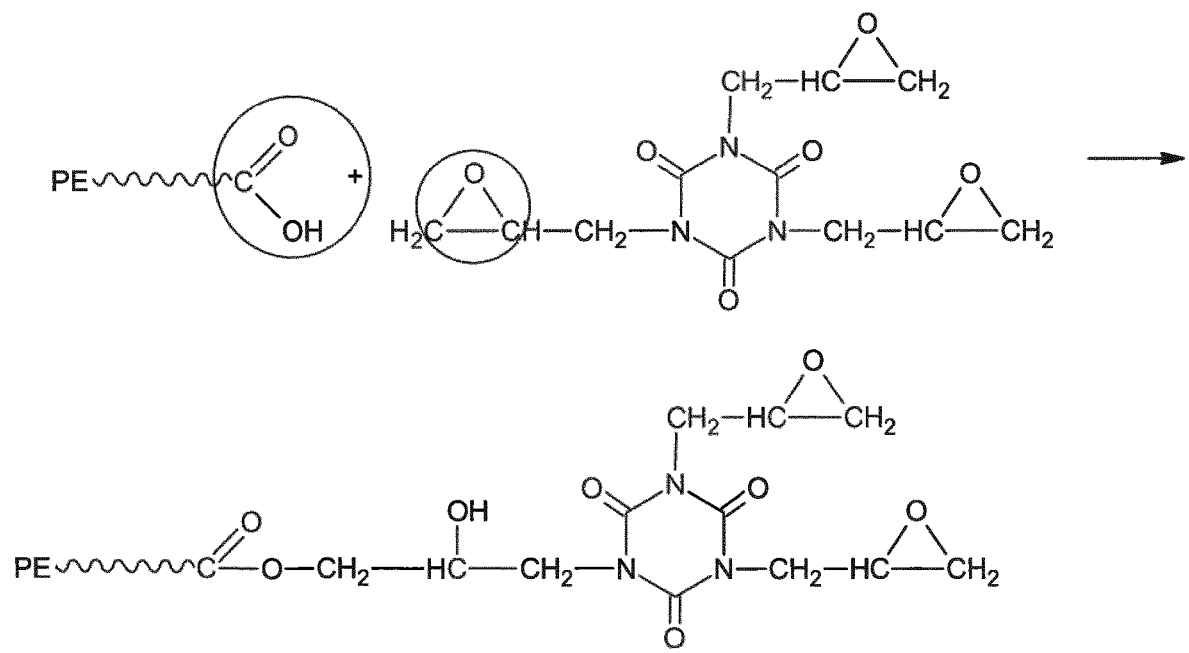

Fig.4b Carboxylated polyester cured with Hydroxyalkylamide
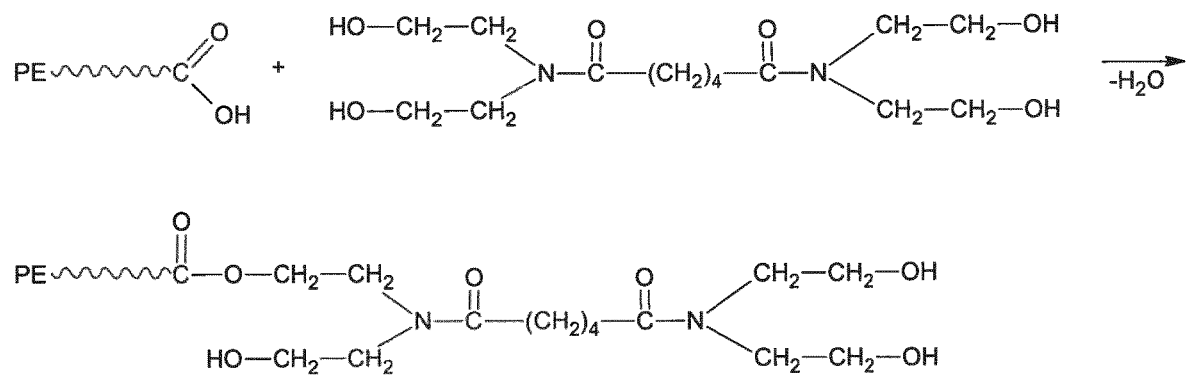
Fig.4c Carboxylated polyester cured with Glycidylester
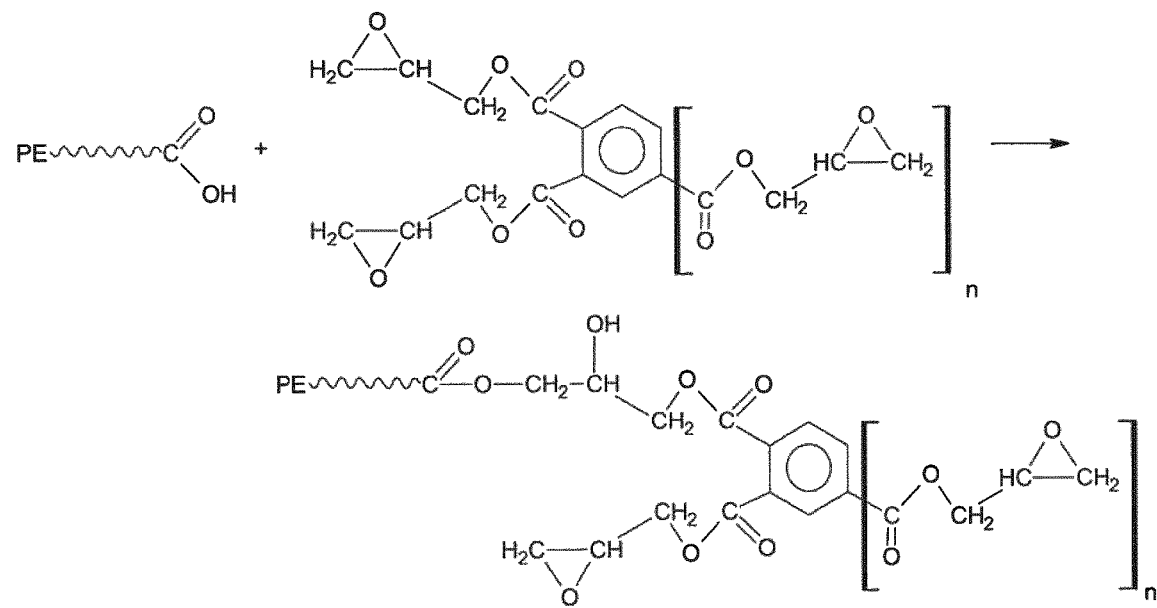

Fig. 4d Carboxylated polyester crossliked with Epoxy resin (Hybrid system)
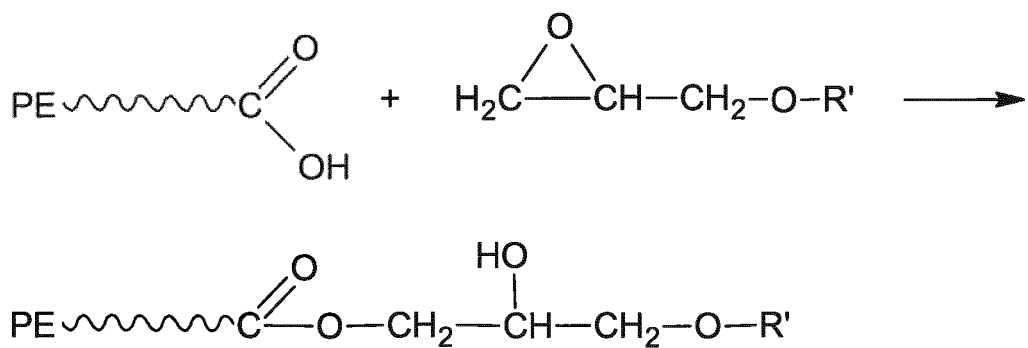
Fig. 4e Hydroxylated Polyester cured with Isocyanate aduct
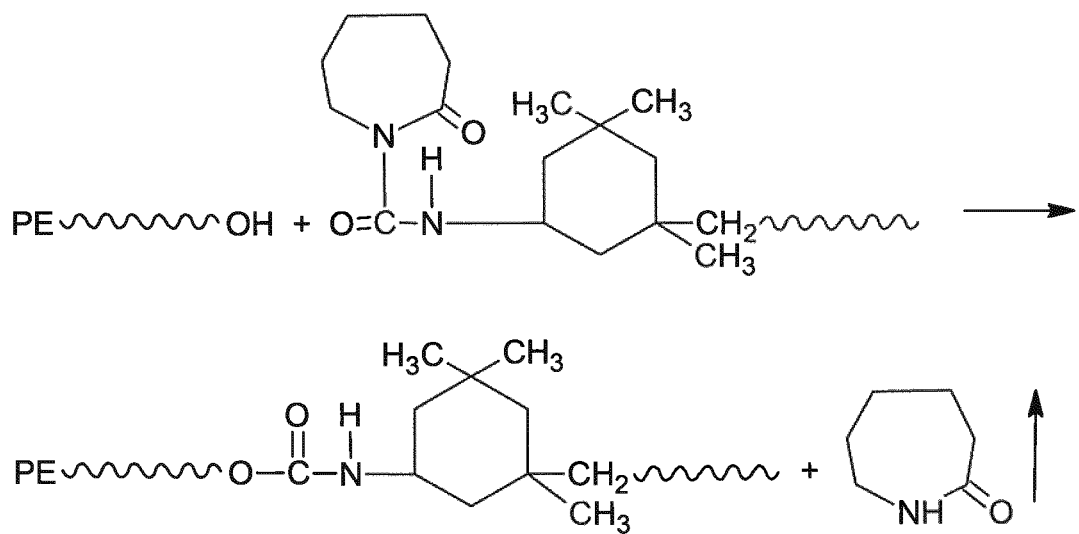

Fig.4 f Hydroxylated Polyester cured with Polyisocyanate (Polyuretdione)
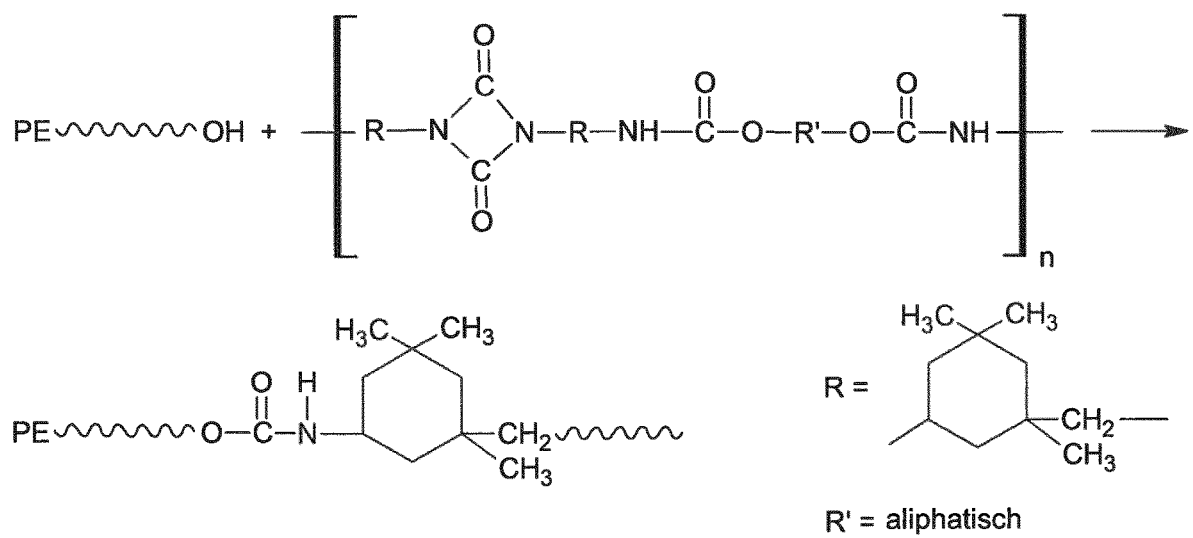

Fig.5 GMA –Acrylate resin
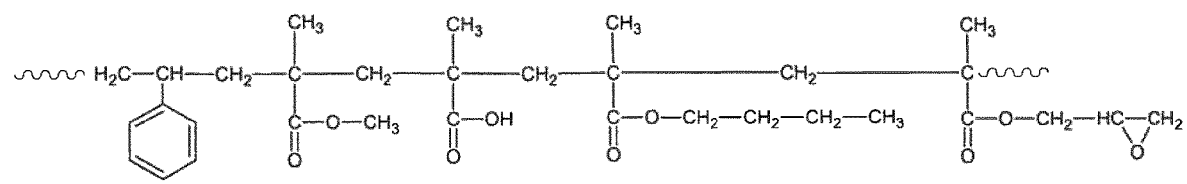
Fig.5a GMA-Acrylate resin cured with dicarbonxylated acid
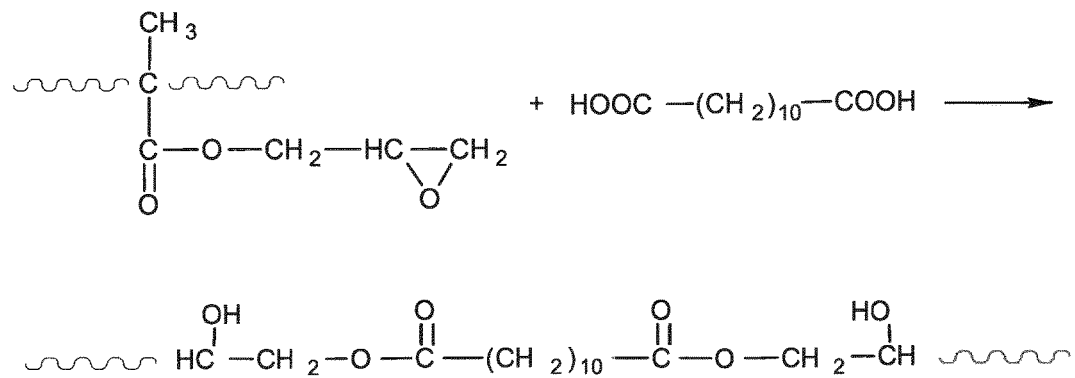
Fig.6 3D part produced from thermosetting powder
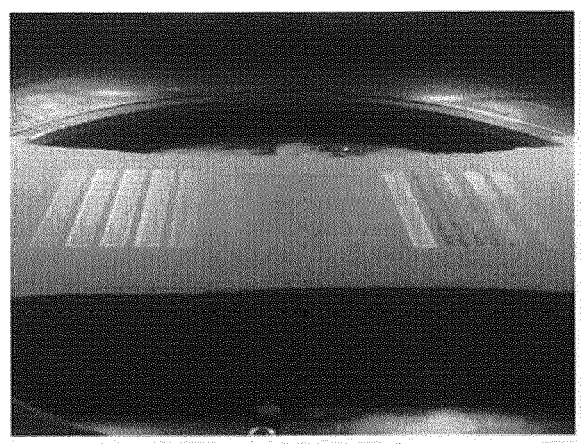

Fig.7: 3D parts produced with 3 different conditions
(a) Part produced with energy density of 25,2 kJ/m$^2$: laser power 16W, 2 scan counts, scanning speed 5000 mm/s
(b) Part produced with higher energy density of 31,5 kJ/m$^2$: laser power 10W, 2 scan counts, scanning speed 2500 mm/s
(c) Part produced with energy density of 31,5 kJ/m$^2$: laser power 10W, 4 scan counts, scanning speed 5000 mm/s
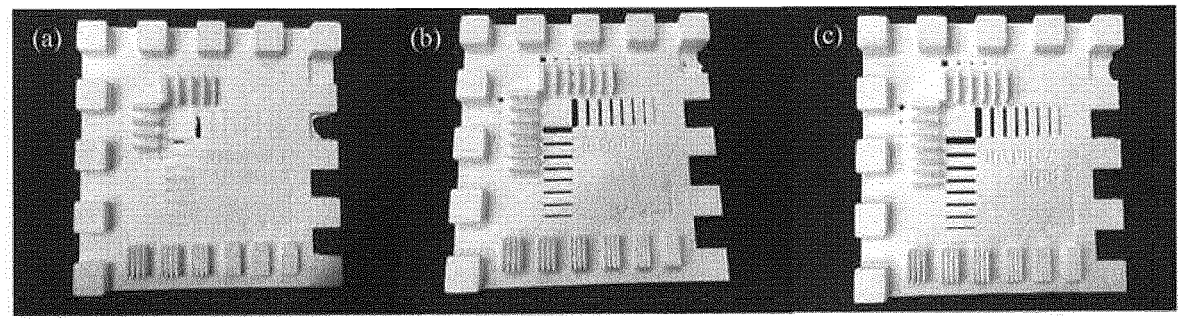

Fig. 8 3D parts under use of the powder Examples 7, 8 and 9 in Example 10
a) Parts made out of powder of Example 7 (left: set 1, right: set 2)
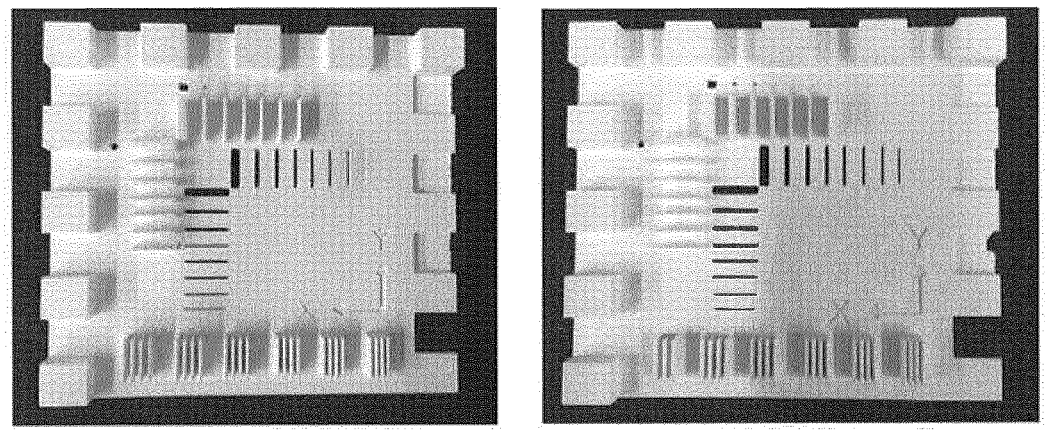
b) Parts made out of powder of Example 8 (left: set 1; right: set 2)
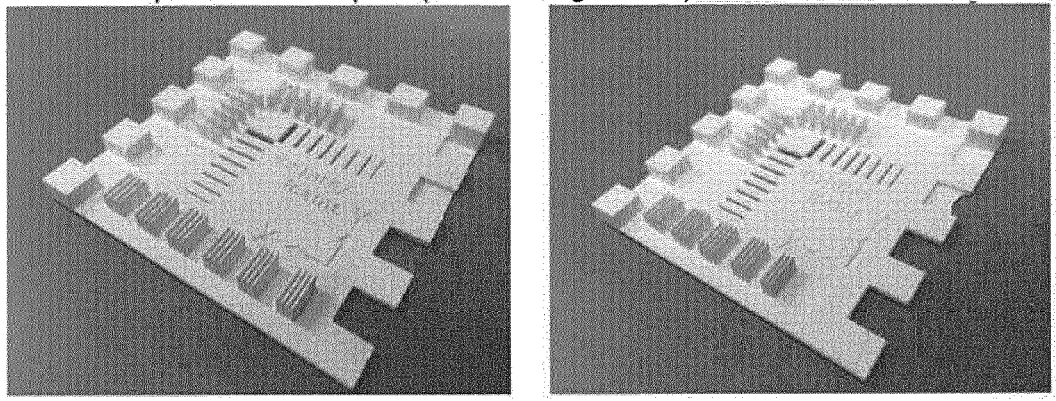
c) Parts made out of powder of Example 9 (left: set 1; right: set 2)
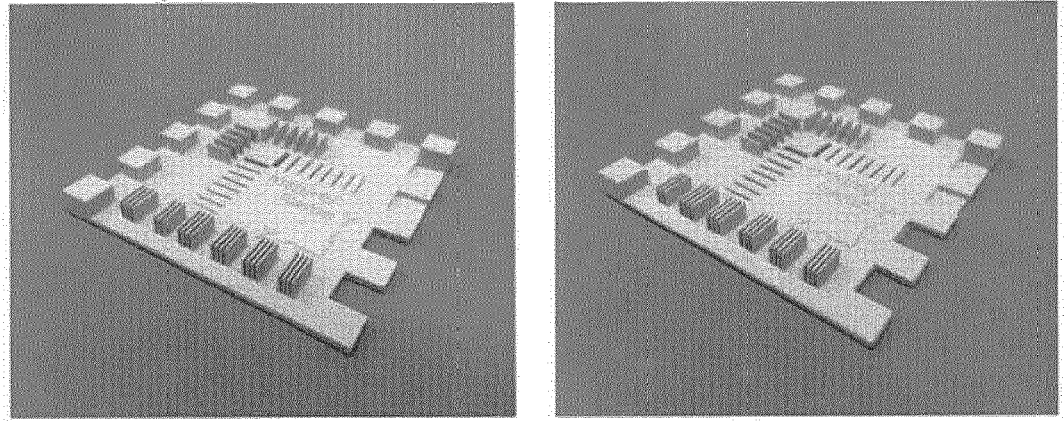

Fig 9.a) Top view of the build set up; b) Side view of the build set up
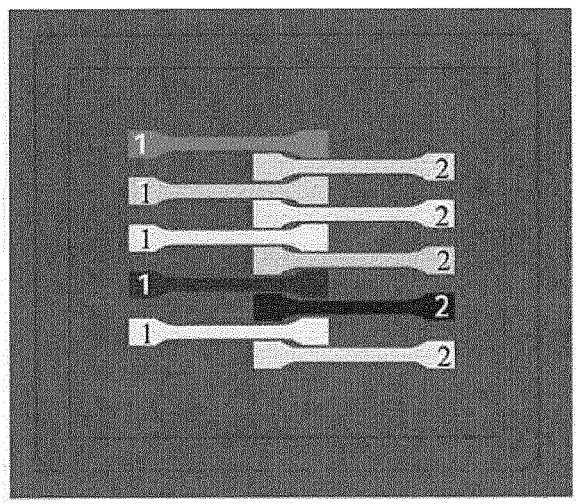 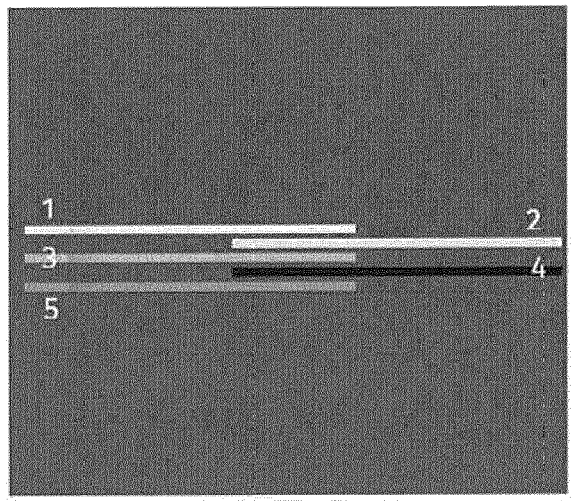

USE OF A THERMOSETTING POLYMERIC POWDER COMPOSITION

CROSS REFERENCE TO RELATED APPLICATIONS

This application is a national phase application under 35 U.S.C. § 371 of International Application No. PCT/EP2018/056251, filed 13 Mar. 2018, which claims priority to European Patent Application No. 17160613.0, filed 13 Mar. 2017; the entire contents of each is specifically incorporated by reference herein without disclaimer.

BACKGROUND

Field of the Invention

The present invention relates to the field of rapid prototyping (e.g. 3 D Printing) and is particularly directed to the development of polymeric materials for producing functional parts, prototypes, models or tools by way of a 3D printing process.

Related Art

In almost any field of mechanical engineering there is an existing need for the rapid production of prototypes. Laser Sintering, as it is already known in the state of the art, is the widespread rapid prototyping technology enabling the direct manufacture of three-dimensional articles of high resolution and dimensional accuracy from a variety of powdered materials, including conventional polymer powders. Prototypes or even production parts may be efficiently and economically produced by this process, which is often referred to as Selective Laser Sintering (SLS®, DTM Corporation, Austin, Tex.) (referred to as SLS herein).

SLS was developed in the mid 1980's by Carl Deckard and Joseph Beaman in the Mechanical Engineering Department at the University of Texas. SLS is a powder based 3D model fabrication method using a high power laser, e.g. $CO_2$ or Nd:YAG, to sinter polymer powders to generate a 3D model. In the SLS process, a first layer of powder is deposited evenly onto a stage by a roller, and is then heated to a temperature just below the powder's melting point. Then, a laser beam is selectively scanned over the powder to raise the local temperature to the powder's melting point to fuse the single powder particles together. After the first layer is thereby completed, a second layer of powder is added, leveled, and again sintered in the desired areas. These steps are repeated to create a 3D model. An inert gas is routinely used to prevent oxidation during Selective Laser Sintering.

Detailed description of SLS technology may be found in U.S. Pat. Nos. 4,863,538 A, 5,017,753 A and 4,944,817 A. Furthermore, U.S. Pat. No. 5,296,062 A describes a method and apparatus for selectively sintering a layer of powder to produce a part comprising a plurality of sintered layers.

Meanwhile, various powders have been developed for use in this technology. Reference is made in this respect, for instance, to DE 101 22 492 A1, EP 0 968 080 A1, WO 03/106146 A1, or DE 197 47 309 A1.

U.S. Pat. No. 6,136,948 A and WO 96/06881 A provide detailed description of laser sintering process for producing moldings from powdered polymers. A wide variety of thermoplastic polymers and copolymers is disclosed in those documents, e.g. polyacetate, polypropylene, polyethylene and polyamide.

Polyamide-12 (PA 12) powder has proven particularly successful in industry for SLS to produce moldings, in particular to produce engineering components. The parts manufactured from PA12 powder meet the high requirements demanded with regards to mechanical loading. EP 0 911 142 A1 describes the use of PA 12 powder for producing moldings by SLS. U.S. Pat. No. 8,124,686 B describes the process to prepare the PA 12 powder suitable for SLS.

US 2007/0126159 A1 relates to the use of thermoplastic polyester powder in a shaping process, and moldings produced from this polyester powder.

U.S. Pat. No. 8,247,492 B2 and U.S. Pat. No. 8,592,519 B2 provide thermoplastic polyester powder compositions reinforced with fibers that are useful in laser sintering. The documents also relate to the method of manufacturing articles from such powder compositions.

US 2010/0160547 A1 discloses polymeric powder compositions useful in sintering applications such as 3D printing processes.

Fused Deposition Modeling (FDM) is another 3D printing process commonly used for modeling, prototyping, and production applications. The process works on an "additive" principle by laying down material in layers; for this a plastic filament or metal wire is unwound from a coil and supplies material to an extrusion nozzle which can turn the flow on and off. There is typically a worm-drive that pushes the filament into the nozzle at a controlled rate. The model or part is produced by extruding molten material through the nozzle to form layers as the material hardens immediately after extrusion. During FDM, the hot molten polymer is exposed to air, so operating the printing process within an inert gas atmosphere such as nitrogen or argon can significantly increase the layer adhesion and leads to improved mechanical properties of the 3D printed objects.

Yet another 3D printing process is the selective fusing of materials in a granular bed. The technique fuses parts of the layer and then moves upward in the working area, adding another layer of granules and repeating the process until the piece has built up. This process uses the unfused media to support overhangs and thin walls in the part being produced, which reduces the need for temporary auxiliary supports for the piece.

Selective Laser Melting (SLM) does not use sintering for the fusion of powder granules but will completely melt the powder by using a high-energy laser beam to create fully dense materials in a layer-wise method that has mechanical properties similar to those of conventional manufactured materials.

Selective Heat Sintering (SHS) uses a thermal printhead instead of a laser beam to produce 3D objects, the process is designed to use a thermoplastic powder. In the printer, a roller applies a layer of plastic powder across a heated build platform. The thermal printhead traces the object's cross-sectional area over the powder, applying just enough heat to sinter the top layer of powder. Once the layer is complete, the process is repeated with the next layer until a complete 3D object is formed. Excess powder surrounding the object helps provide support for complex shapes and overhangs. Unused powder is also reusable for the next 3D print. Since thermal printheads are less expensive, the overall cost of selective heat sintering is more affordable than SLS.

Turning now to the materials used in the above mentioned 3D printing processes, a particular disadvantage of the use of semi-crystalline thermoplastics, e.g. PA 12, is that it leads to shrinkage problems, therefore it is complicate to produce accurate parts. In another aspect, the use of semi-crystalline thermoplastics also provides dense parts, which may not be an advantage for some applications where high porosity for light weight parts but with a remaining part strength is preferred. In such applications, amorphous thermoplastics are preferred over semi-crystalline thermoplastics like PA 12. However, a disadvantage of amorphous thermoplastics is high viscosity, which permits coalescence only above melting point or above the glass transition temperature of the thermoplastics used.

Another disadvantage of the use of thermoplastic powder materials is that parts produced from it have only low dimensional stability at high temperature working conditions.

On the other hand, chemically crosslinked (cured) polymers, so called thermosets, have outstanding thermal and chemical properties and are irreplaceable in demanding applications, such as in structural parts needed by the aircraft and automotive industries.

Thermoset materials have so far being utilized only in liquid form and also only in laser-stereolithography, a process that fabricates 3D objects in a bath of liquid photopolymer. This process, however, needs complicated support structures to retain the interim material produced after each pass of the printing process in the liquid bath. Due to the liquid form of the thermoset material required for this technique, the choice of material variety is limited.

US 2007/0241482 A1 relates to the production of three dimensional objects by use of electromagnetic radiation. The material system disclosed in this document and used for 3D printing comprises a granular material including a first particulate adhesive selected from the group consisting of a thermoset material and a thermoplastic material; and an absorber (fluid) capable of being heated upon exposure to electromagnetic energy sufficiently to bond the granular material. The absorber process described in this document provides a way to deliver heat to a printed layer in a 3D printer. In such a process, a dry particulate building material is treated with a liquid deposit in a cross-section of an article to be built, where the liquid engenders a solidification in the particulate build material by means of the absorber used.

The research group at Harvard University Cambridge reported on "3D-Printing of Lightweight Cellular Composites" (Adv. Mater. 2014, V 26, Issue 34, 5930-5935). The fiber reinforced composite 3D part described in this document was made of an epoxy-based ink and manufactured by 3D extrusion printing technique.

US 2014/0121327 A1 describes a process for producing a crosslinked powder using Diels-Alder reaction. A disadvantage of this Diels-Alder system is the limitation of material variety due to the specific chemistry requirements of material for Diels-Alder reaction. Another disadvantage is that the Diels-Alder reaction is thermoreversible and may not allow for applications requiring high thermostability.

In the SLS process high power lasers, e.g. $CO_2$ and Nd:YAG, are used to sinter polymer powders in order to generate a 3D model. A $CO_2$ laser was already successfully used to completely cure thermosetting powder (Lala Abhinandan 26/SPIE Vo. 2374 & J. Laser Appl. 11, 248, 1999; Giuseppina Simane, Progress in Organic Coatings 68, 340-346, 2010). The experiments and results in these documents referred to 2D applications, not to 3D printing applications.

WO 2008/057844 A1 D1 is directed to powder compositions which include at least one polymer powder that is preferably laser sinterable, together with reinforcing particles. According to this document a laser beam selectively irritates the powder layer within the defined boundaries of the design, resulting in melting of the powder on which the laser beam falls. The control mechanism operates the laser to selectively sinter sequential powder layers, eventually producing a complete article comprising a plurality of layers sintered together. The term "laser sinterable polymer powder" as used in this document is defined to refer to a powder which is capable of being melted by a laser beam of the LS (Laser Sintering) machine.

XP-002754724 (JP 20080107369) describes a composite material powder which can be used for the manufacture of a moulded product by Selective Laser Sintering. The composite powder comprises spherical aggregates and a resin powder, said spherical aggregates comprising a spherical thermosetting resin curing material and spherical carbon. As an example, use of phenol resin material and polyamide 12 is disclosed.

US 2004/0081573 A1 discloses a polymeric binder material comprising thermoplastics and thermoset polymers together with metal particles and metal hydride for forming a green article, after removal of unfused material from the green article it is placed in an oven or finance to decompose and drive off the binder and sinter the metal substrate particles. During printing, the powder is fused or sintered, by the application of the laser energy that is directed to those portions of the powder corresponding to a cross section of the article. After defusing powder in each layer, an additional layer of powder is then dispensed, and the process repeated, with fused portions of later layer fusing to fused portions of previous layers until the article is complete.

SUMMARY OF THE INVENTION

It is thus an object of the present invention to provide, for the rapid prototyping process in form of 3D printing, in particular for the SLS, FDM and SHS processes, a powder material being capable of curing reactions within the printing process to form a 3D object with good mechanical properties, adequate stability, good end use of temperature and for light weight applications. Although several polymeric powders have already been developed for the 3D printing technology, the existing materials typically suffered from one or more drawbacks such as e.g. cost, ease of use, shrinkage problem, mechanical properties or stability at elevated temperature environments. Furthermore, 3D printing has been developed for thermoplastic materials but not for a 3D printing technique for a thermoset polymer powder system where curing occurs during melting (sintering). The challenge for such a printing technique is that a thermoset polymer powder must be melted and at least partially be cured under the very short energy exposure of the 3D printing process, leaving free functionalities for curing/crosslinking with the next printed layer.

Thus, there is a need for the developments of a new class of polymeric powder compositions useful in a 3D printing process, which compositions comprise curable polymeric binder material, composites produced when using such powder compositions, especially fiber reinforced composites, and the suitable printing processes when using such polymeric powder compositions, enabling the production of specific moldings when outstanding thermal and chemical properties as well as structural dimensional stability is required.

To surpass the disadvantages of the state of the art as mentioned above, the present invention provides for the use of a thermosetting polymeric powder composition in a 3D printing process to produce a 3D thermosetting plastic, wherein the composition comprises at least one curable polymeric binder material in an amount of up to 95 wt-%, preferably up to 98 wt-%, of the total composition and at least one thermoplastic material having a glass transition temperature ($T_g$) and/or a melting point ($M_p$) below the temperature provided in a pass of the printing process in an amount of between 1 and 30 wt % of the total composition and wherein during each pass of the printing process said polymeric binder material is at least partially cured within the layer thus formed and also at least partially crosslinked with the previous layer. Such a use also enables production of moldings with high porosity but remaining part strength, light weight and durability as honeycomb structures utilized in composite materials. In the curable polymeric binder material as used according to the present invention, the heating during the 3D printing process results in both sintering/melting as well as at least partial chemical crosslinking of the curable polymeric binder material. The composition as used is formulated in a way that the curing reactions will occur after very short energy exposure, therefore the powder composition cures (crosslinks) at least partially already during sintering/melting. In case of pure UV curing systems also UV light is necessary for curing. The powder composition as used according to the present invention comprises mainly amorphous curable polymeric binder material resulting in cured (crosslinked) printed 3D produced by for instance the SLS process with high porosity. When this high porosity structure is additionally reinforced with short fibers, e.g. "whiskers", the objects gain mechanical properties and also show the unique lightweight properties of conventional honeycomb composite materials. The presence of a thermoplastic material with a $T_g$ (e.g. in case of an amorphous material or in amorphous regions within semicrystalline materials) and/or a $M_p$ (in case of a semicrystalline or crystalline material) below the temperature provided in a pass of the printing process in the thermosetting polymeric powder composition resulted in a surprisingly huge improvement concerning flexibility and elasticity of the printed 3D products when compared to 3D products printed with the same composition lacking such thermoplastic material. It was found that such a thermoplastic material showed improved mixing abilities with the thermosetting polymer, providing for a more uniform composition and therefore also better properties of the printed 3D product. The temperature provided in a pass of the printing process can vary depending on the powder composition used and the specific printing processes (FDM, SLM, SHS, SLS etc.) and normally amounts to below 250° C., preferably below 175° C. and most preferred below 125° C. In case of the SLS process, the temperature provided in a pass of the printing process is almost impossible to measure because of the laser beam providing the necessary energy. Estimations based on the energy density of the laser and the heat capacity of the powder composition used and under the assumption that the laser energy is completely transformed into heat, lead to temperatures up to about 400 to 600° C. In such a case, the fact that the thermoplastic material present in the powder composition is melted during each part of the printing process proves that the temperature provided in the pass of the printing process was above the glass transition temperature ($T_g$) and/or the melting point ($M_p$) of the thermoplastic material.

If in connection with the present invention the term $T_g$ and/or $M_p$ is used, in case of a specific thermoplastic material which has neither a defined $T_g$ nor a $M_p$, this term refers to the temperature at which during heating the first change of the dimensions of the thermoplastic material particle can be observed. Beside the applications in SLS, the powder composition according to the present invention can be used to produce 3D parts by utilizing other techniques, such as Fused Deposition Modeling (FDM) or Selective Heat Sintering (SHS) or generally any 3D printing process where sufficient energy for at least partially curing the thermosetting material within the layer, at least partially crosslinking the thermosetting material with the previous layer and melting of the thermoplastic material is provided during each pass of a printing step.

Also, if the sum of curable polymeric binder material and thermoplastic material does not add up to 100 wt % of the total composition, it is understood that the rest is/are selected from crosslinking (curing) agents, catalysts, accelerators, flow agents, absorbers, additives, fillers, plasticizers, pigments, dyes and mixtures thereof, as they are already known in the state of the art.

Surprisingly it was found that some 3D thermosetting plastic objects produced according to the present invention showed surprising effects insofar as they became more flexible at elevated temperature but still remained in their printed form. This fact was observed for several thermosetting powder coating formulations, such as epoxy based systems, peroxide-unsaturated polyester based systems and especially hybrid systems, which comprise at least one epoxy resin and at least one carboxylated polyester resin.

It was also found that 3D thermosetting plastic objects produced according to the present invention could successfully be coated with coating materials, in particular with powder coating materials, further in particular with powder coating materials for outdoor applications (in particular for protection of a 3D thermosetting plastic object made of powder material for indoor applications for outdoor use) and especially with effect coatings comprising effect particles such as metallic effect particles, interference effect particles and flip flop effect particles. On the one hand, coating of 3D thermosetting plastic objects results in a price advantage compared to 3D thermosetting plastic objects fully made out of more expensive powders, such as effect powders, which may be formulated from the inventive powder compositions by addition of e.g. metallic pigments or other additives and on the other hand a potential technical advantage as the reflecting pigments of an effect coating might disturb the SLS laser during the printing process.

The powder composition as used according to the present invention can be based on thermoset powder coating formulations already known in the state of the art, comprising curable polymeric binder powders, crosslinking (curing) agents, catalysts, accelerators, flow agents, absorbers, additives, fillers, plasticizers and pigments and can be modified to fulfill all material requirements for use in a 3D printing process. Objects produced with such thermosetting powder compositions according to the present invention could have applications in many fields, including the automotive and aircraft industry (especially regarding fiber reinforced composite components), where lightweight materials hold a key to achieving aggressive government-mandated fuel economy standards. Further applications for lightweight and high porosity printed 3D objects and parts could be for instance the surface, base, membrane and/or lining of skis or generally any 3D sport tools requiring high porosity and light weight. The use of the thermosetting polymeric powder composition according to the present invention in a 3D printing process provides 3D articles having improved thermal stability, flexibility and elasticity since they comprise cured and crosslinked thermosetting plastics together with at least one thermoplastic material and are therefore not meltable like 3D articles made solely of thermoplastic material.

BRIEF DESCRIPTION OF THE FIGURES

FIG. 1 is an example for interlayer-crosslinking of the powder during SLS.

FIG. 2 is an example of crosslinking network caused by the reaction between epoxy resin with amine.

FIG. 3 is the chemical structure of bisphenol A epoxy resin; FIG. 3a is the chemical structure of epoxy resin cured with amine; and FIG. 3b is the chemical structure of epoxy resin cured with acid anhydride.

FIG. 4 is the chemical structure of functional polyester resins; FIG. 4a is the chemical structure of carboxylated polyester (PE) cured with TGIC; FIG. 4b is the chemical structure of carboxylated polyester cured with Hydroxyalkylamide; FIG. 4c is the chemical structure of carboxylated polyester cured with Glycidylester; FIG. 4d is the chemical structure of carboxylated polyester crosslinked with Expoxy resin (Hybrid system); FIG. 4e is the chemical structure of hydroxylated polyester cured with Isocyanate aduct; and FIG. 4f is the chemical structure of hydroxylated polyester cured with Polyisocyanate (Polyuretdione).

FIG. 5 is the chemical structure of GMA-Acrylate resin; and FIG. 5a is the chemical structure of GMA-Acrylate resin cured with dicarbonsylated acid.

FIG. 6 illustrates a 3D part produced from thermosetting powder.

FIG. 7 illustrates 3D parts produced with three different conditions; (a) Part produced with energy density of 25.2 kJ/m$^2$: laser power 16 W, 2 scan counts, scanning speed 5000 mm/s; (b) Part produced with higher energy density of 31.5 kJ/m$^2$: laser power 10 W, 2 scan counts, scanning speed 2500 mm/s; (c) Part produced with energy density of 31.5 kJ/m$^2$: laser power 10 W, 4 scan counts, scanning speed 5000 mm/s.

FIG. 8 illustrates 3D parts under use of the powder of (a) Example 7, (b) Example 8, and (c) Example 9.

FIG. 9 illustrates a (a) top view of the build set up; and (b) a side view of the build set up.

DETAILED DESCRIPTION

Figure 10:
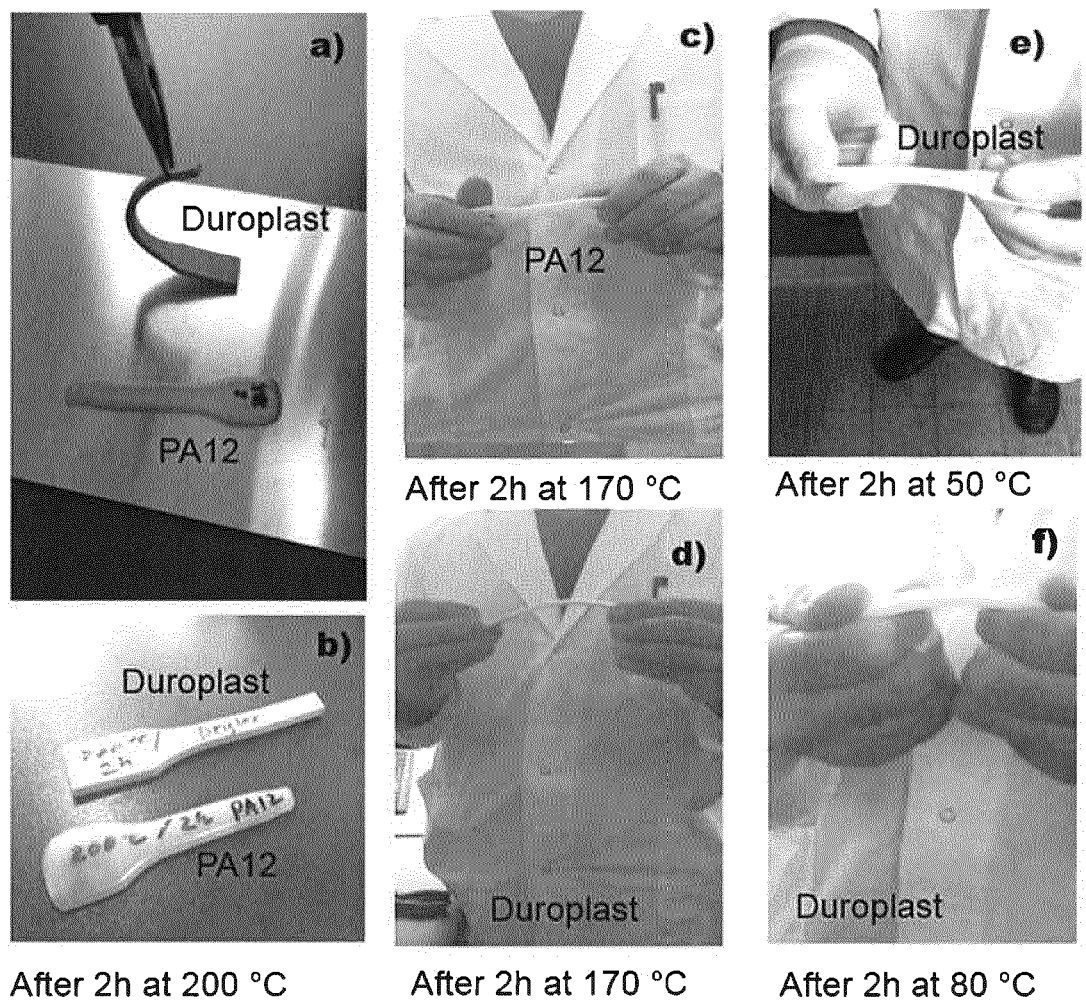
FIG. 10 illustrates four bars printed out of a powder composition as given in Example 12 after postcuring with the same conditions described above were placed in 4 ovens held at different temperatures at 50° C., 80° C., 170° C. and 200° C. for 2h, respectively. Then each bar was taken out from the oven and instantly tested as to its flexibility by bending manually by hand when the sample was still hot.

During the melting/sintering step of the 3D printing process, part of the energy provided by the laser, or generally the printing head and/or any other energy device during each pass of the printing process is penetrating through the top layer and causes crosslinking reactions of the free functionalities left on the surface of the previously printed layer with free functionalities in the top layer and eventually also completing the inter-crosslinking within the previously printed layer, thereby improving the curing degree and also physical properties of the printed part. The energy density should not be too high to avoid polymer degradation, but still must be sufficient to provide for crosslinking between the printed layers, improving the curing degree of the previously printed layer and melting the thermoplastic material. The scanned section of powder from one layer can remain partially molten (partially crosslinked) while the next layer of powder is spread over the existing one. When the printhead scans this next layer and the heat affected zone reaches the full thickness of it, molten powder chemically reacts with molten powder (FIG. 1).

It is also possible to provide for free functionalities in each printed layer via the composition of the polymeric powder according to the present invention, for instance by providing an only non-stoichiometric amount of curing agent in each layer, or by way of the catalyst amount or activity, catalysts are employed, by the particle size distribution (heat absorption for melting is depending from particle size, which means that with bigger particles only a small amount of heat is left for curing within the same pass of the laser, or generally the printing head and/or any other energy device during the printing process) and also by the individual thickness of each printed layer.

The powder composition of each printed layer may still not be fully cured during the energy input of each pass of the printing process.

According to a preferred embodiment of the present invention, at least one of the thermoplastic materials present in the composition has functional groups able to react with the curable polymeric binder material.

Preferably the at least one thermoplastic material is/are present in an amount of between 5 and 20 wt % of the total composition, more preferable between 5 and 15 wt %. It has surprisingly been found that adding a thermoplastic material into the powder composition of the present invention results in an improvement of the flexibility of the cured thermoset powder.

According to a preferred embodiment of the present invention, the composition as used comprises in addition to the at least one curable polymeric binder material and the at least one thermoplast also at least one member of the group consisting of curing agent, catalyst, initiator, and mixtures thereof, which member is able to cure said polymeric binder material. The use of chemical crosslinking in the process according to the present invention also enables the production of high dense moldings, which are limited when using the amorphous thermoplastic systems according to the state of the art in for instance Selective Laser Sintering. Upon application requirements, the formulation of the curable polymeric binder material as used according to the present invention can be tailor made with the right curing agents and fillers to achieve high dense moldings.

The powder composition used according to the present invention may therefore comprise a curable polymeric binder material (a) and at least one curing agent (b), where (a) and (b) are able to react with each other to form a cured network. A catalyst and/or initiator (for UV-systems) may be added, either instead of or together with the curing agent, to initiate the curing reaction or to accelerate the reaction once started, depending on the specific chemistry of the reaction.

It is also preferred that the polymeric binder material is curable by polyaddition, and/or polycondensation and/or radical polymerization. Such curing mechanisms can also include a more specific polymerization.

Furthermore, another preferred embodiment of the present invention provides that the curable polymeric binder material is selected from the group comprising compounds with at least two functional groups comprising carbon-carbon double bonds, compounds with at least two epoxy functional groups, compounds with at least two carboxylic acid functional groups, compounds with at least two hydroxyl functional groups, compounds derived from acrylic acid or methacrylic acid and/or mixtures thereof. The curable polymeric binder material and the curing agent can thus for instance be selected from the group consisting of epoxy with amines, amides, amino, polyphenols, acid anhydrides, multifunctional acids; epoxy with phenolic resins, epoxy with carboxylated polyester (namely hybrid systems); carboxylated polyester with hydroxyalkylamide (HAA), triglycidylisocyanurat (TGIC), glycidylester-epoxyresins (hybrids); hydroxyl-terminated polyester with polyisocyanates (blocked isocyanate or uretdione); GMA-acrylate system (epoxy functional acrylic resins cured with dicarboxylic acids), carboxyl-acrylate (carboxylated acrylic resin cured with epoxy), hydroxyl-acrylate (hydroxyl functional acrylic resins cured with blocked isocyanates); unsaturated polyesters; polyurethane/urea; isocyanate/alcohol; reactive functional polyamides, carboxylated polyamide with epoxy, thermal and/or UV radical initiators, IR or UV curable polymers and/or mixtures of two or more of said compounds and/or systems.

Generally, the thermosetting polymeric powder composition utilized according to the present invention can also be based on known powder coating chemistry with curing mechanisms or combinations thereof. Some exemplary embodiments are described in the following. It is, however, obvious for a person skilled in the art to compose further compositions.

Epoxy systems (FIG. 2), such as epoxy cured with amines, epoxy cured with acid anhydrides, epoxy cured with polyisocyanates and epoxy cured with phenolic resins. In all those systems, the curing process take place by an addition reaction. In FIG. 3 as enclosed the chemical structure of bisphenol A epoxy resin, which is often used in powder coating formulation and which can also be used according to the present invention as curable polymeric binder material in a powder composition for a Selective Laser Sintering process. FIGS. 3a and 3b show the curing reactions of epoxy with typical curing agents, such as amine and acid anhydride.

Carboxylated polyester systems (FIG. 4), such as carboxylated polyester cured with triglycidylisocyanurat (TGIC) (FIG. 4a), hydroxyalkylamide (HAA) (FIG. 4b), glycidylester (FIG. 4c); carboxylated polyester cured epoxy resin, a hybrid system (FIG. 4d); hydroxyl-terminated polyester cured with polyisocyanates (blocked isocyanate or uretdione) to form a polyurethane network (FIG. 4e and FIG. 4f).

Acrylic systems such as glycidyl methacrylate (GMA-acrylic, FIG. 5) cured with polycarboxylic acid (e.g. dodecanedioic acid or acelainic acid) (FIG. 5a).

Unsaturated polyester systems where the crosslinking occurs via free radical polymerization with the use of peroxide catalyst or other thermal initiators. Also the curing via electromagnetic radiation like UV or electron beam alone or in combination with thermal initiators is possible.

Other crosslinkable materials such as vinyl ethers, bismaleimides, polyurethane/urea; isocyanate/alcohol; reactive functional polyamides, carboxylated polyamide with epoxy, IR crosslinkable polymers etc.

To form a three-dimensional cured polymeric network, the average functionality of the curable polymeric binder material as used according to the present invention must be greater than 2. If the functionality is less than 2, no curing can occur.

The thermosetting polymeric powder composition utilized according to the present invention can furthermore be designed such that functional features can be achieved such as self-healing properties, shape memory effects, excellent electrical conductivity (e.g.: by incorporation of graphene), anticorrosion properties and good mechanical properties. Self-healing features can be implemented by utilizing reactive components having reversible bonding such as disulfide linkages (—S—S—), or Diels-Alder reaction educts and/or products, in the polymer chains and/or the powder composition. It is, however, obvious for a person skilled in the art that further components capable of reversible bond formation/cleavage under treatment with heat or radiation can be used to introduce self-healing effects. These reactive compounds can be present in the polymer chains of the polymer binders or of the crosslinking agents. Besides, shape memory materials such as polycaprolactone can be added to assist the self-healing action or can also be used where the applications require a shape memory effect.

According to a preferred embodiment of the present invention, the curable polymeric binder material is contained in the thermosetting polymeric powder composition with from 10 to 70 wt-%, particularly preferably with from 20 to 60 wt-%, of the total composition.

The thermosetting polymeric powder composition used according to the present invention can utilize Michael addition reactive components. The reactive components may include multifunctional Michael donor (amine, thiol or acetoacetate) and Michael acceptor (acrylonitrile, acrylamides, maleimides, acrylate esters, acrylate, maleic or fumaric functional components). For example acrylate esters can react with an amine through a Michael addition reaction. The resulting secondary amine-acrylate adduct can then react with another acrylate ester or, preferably, with an epoxy resin, forming a highly crosslinked polymer. The Michael addition chemistry can be used further in the powder composition for photoinduced radical polymerization. The catalyst for Michael additions can be a Lewis base (e.g. hydroxides, amines, alcohols).

Other catalysts for Michael addition reactions can be phosphine compounds, such as tributylphosphine, triphenyl phosphine and tricyclohexanlphosphine. Further catalysts for Michael addition reactions can be Lewis acids, in particular Lewis acidic metal salts or organometallic complexes.

According to a further embodiment, a curable polyester, containing 1 to 100 wt-% of cycloaliphatic glycol compounds with respect to the total weight of the glycol compounds of the curable polyester, can be used as component of the thermosetting powder composition. The cycloaliphatic glycol components can comprise in particular 2,2,4,4-tetraalkylcyclobutane-1,3-diol (TACD), wherein each alkyl substituent can comprise up to 10 carbon atoms and wherein the alkyl substituents can be linear, branched or a mixture thereof and wherein the diols can be either cis- or trans-diols. The curable polyester can comprise any possible mixture of isomers of TACD.

According to an embodiment the cycloaliphatic compound consists of or comprises 2,2,4,4-tetramethyl-1,3-cyclobutanediol (TMCD).

According to another embodiment, a mixture containing 1 to 99 wt-% of TMCD isomers and 99 to 1 wt-% of cycloaliphatic 1,4-cyclohexanedimethanol isomers (CHDM) with respect to the total weight of the cycloaliphatic glycol compounds of the curable polyester is used.

According to another embodiment, polyol compounds, other than the cycloaliphatic glycol compounds, containing at least 1 hydroxyl group are also incorporated into the curable polyester representing at least 1 wt-% with respect to the total weight of all polyol compounds of the curable polyester. These thermosetting polyester resins are particularly useful for outdoor applications achieving at least one of the following properties after completed curing: good chemical resistance, good hydrolytic stability, good weathering stability, high heat resistance, high scratch resistance, high impact strength, toughness, high ductility, good photooxidative stability, transparency and flexibility.

The thermoplastic material to be used according to the present invention can be for example thermoplastic resin particles, core-shell polymer particles or rubber elastomer particles. Among these, thermoplastic resin particles or core-shell polymer particles are preferred. Such core-shell (multilayer) polymer particles comprise one or more (co) polymers and one or more types of core-shell particles or one or more copolymers which are at least partially composed of rubbers with low glass transition temperatures. The core-shell polymer particles have typically an average particle diameter of 0.01 to 15 μm, preferable 0.01 to 10 μm and a agglomerated size of between 5-50 μm with a core $T_g$ of about −40° C. or lower and a shell $T_g$ of between about 100° C. and 120° C. Examples of the core-shell polymer particles include STAPHYLOID® products, which are agglomerated powder of core/shell type, fine particles produced by emulsion polymerization of butadiene, acrylates, and styrene monomer such as STAPHYLOID AC3832, STAPHYLOID AC4030 or STAPHYLOID AC3364. Other examples of core shell polymer particles which can be used according to the present invention are KUREHA products, PARALOID™ impact modifiers and Albidur® products. Also the particle diameters and the $T_g$ values of the core and/or the shell can vary within a wide range as long as the $T_g$ allows the use in a powder suitable for the use in the 3D printing process, preferably with dry powder as base material for the 3D printing.

Generally, thermoplastic materials to be used according to the present invention, depending on the temperature provided in each pass of the printing step, preferably have a melting temperature within the range of between 50° C. and 200° C., preferably between 100 and 150° C. and preferably a melt viscosity of 10 to 500 Pas, more preferably 50 to 250 Pas and most preferably 90 to 150 Pas when tested according to ISO 1133 at 160° C. using 2,16 kg load. In case of a pure amorphous thermoplastic material, the $T_g$ of the amorphous material is preferably below 90° C. and more preferably below 70° C. The thermoplastic material used according to the present invention preferably has a weight-average molecular weight MW of 10000 to 120000, more preferably 20000 to 50000. The thermoplastic material used can be polyurethanes, copolyesters or copolyamides. For example, suitable polymers and copolymers are commercially available under the tradename Griltex, from EMS-Griltex, Switzerland, for instance Griltex 11A, Griltex D1365E, Griltex 1513E, Griltex D2315E, Griltex 1582E can be used according to the present invention.

The powder composition used according to the present invention can be reinforced with fibers, eg. whisker fiber SiC, carbon fibers, glass fibers with a diameter between 0.5 μm to 10 μm and with a length between 1 and 150 μm, preferably 10 to 50 μm. The fibers are preferably made out of ceramic materials, for example silicon carbide (Si—C) microfibers and fibers available under the tradename Si-TUFF (SC-050, SC-110, SC-210, SC-300, SC-310 and S-320) with different functional groups and with different diameters and lengths ranging from 10 to 50 μm can be used to reinforce the mechanical properties of the cured 3D thermosetting plastic.

[Catalyst] Catalysts can also be used according to the present invention. Generally, a catalyst is a compound that increases the speed of a chemical reaction without being consumed in the reaction. The addition of a suitable catalyst decreases the gelation time and can lower the bake temperature needed to achieve acceptable cure of the powder composition used according to the present invention. Catalysts are very specific to a chemical reaction. Some exemplary examples are listed in the following: Lewis bases (e.g. imidazole), ammonium salts, cyclic amidines, Lewis acids (e.g. Lewis acidic metal complexes and salts), amino-phenolic compounds, zinc oxide, amine type compounds, onium compounds, dimethyl stearyl amines, stannous octoate, dibutyl tin dilaurate, dibutyl tin oxide, sulfonic acid/amine, peroxides. Catalysts are typically incorporated at relatively low concentrations of between 0.1-2 wt-%, depending on how effective the catalyst is. However, higher concentrations could also be possible if required.

[Initiator] Also initiators can be used according to the present invention. In contrast to a catalyst, an initiator is consumed in the reaction. The choice of a suitable initiator depends on the powder composition used according to the present invention and is within the knowledge of a person skilled in the art.

In some cases and again depending on the powder composition as used according to the present invention, a mixture of curing agent, catalyst and/or initiator may be used.

[Absorber] A sufficient capability of the curable polymeric binder material to absorb energy at present laser wavelength (e.g. for the $CO_2$ laser at 10.6 μm) is necessary for use in the SLS process. This is apparent for most polymers, as they consist of aliphatic compounds (C—H). Those polymers have, in the majority of cases, some group vibrations in the "fingerprint" infrared region sufficient to absorb relevant portions of 10.6 μm radiation. In the case of a poor absorption capability, an increase of laser energy power can compensate the effect. However, high laser power could also cause polymer decomposition, therefore in order to compensate this effect, absorbers can be added to the powder composition as used according to the present invention.

The powder composition can also comprise an absorber yielding a desired absorption at a wavelength optimal for laser curing. The absorber may for instance be adapted to absorb at the wave length of 10.6 μm specific for the $CO_2$ laser. The absorber can be blended together with the polymeric powder composition as used according to the present invention. An example of an absorber is carbon black, specifically for SLS processes using electromagnetic radiation in the IR range. While carbon black is a preferred IR absorber, other pigments such as iron oxide or quinoid rylenedicarboximides can also be used. The absorbers should transform the light energy into heat of the polymeric thermosetting powder composition if the thermosetting powder composition is unable to do so in the desired extent.

[Filler] The powder composition according to the present invention may also include filler materials. The particulate filler represents up 50 wt-% of the total composition, and preferably from 20 to 30 wt-%. The filler materials may include or consist of inert fillers or active fillers and can for instance be selected from the group of carbonate-based mineral fillers, magnesium carbonate, calcium carbonate, barium sulphate, dolomite, kaolin, talc, micro-mica, alumina hydrate, wollastonite, montmorillonite, zeolite, perlite, nano fillers, pigments, such as titanium dioxide (e.g. anatase and/or rutile type), transition metal oxides, graphite, graphene, carbon black, silica, alumina, phosphate, borate, silicate and organic fillers, such as polymer powders, like copolymers, elastomers and thermoplastics, used alone or as a mixture of two or more of these materials. Also, the waste powder of powder coatings production (cured or uncured) and of 3D dry printing processes according to the invention could be used as fillers depending on the product requirements.

[Flow agent] In order to improve melt and powder flow during production of the 3D objects, a flow agent can be added to the thermosetting polymeric powder composition used according to the present invention. Preferably this flow agent is of substantially spherical shape. The flow agent can for instance be an inorganic powdered substance having a particle size of less than 20 microns, preferably less than 10 microns, selected from the group consisting of hydrated silicas, amorphous alumina, glassy silicas, glassy phosphates, glassy borates, glassy oxides, titania, talc, mica, fumed silicas, kaolin, attapulgite, calcium silicates, alumina, magnesium silicates and/or mixtures thereof. The flow agent is present only in an amount sufficient to cause the resin powder to flow and level during the layer by layer process employed in the 3D dry printing process. It is preferred that the thermosetting polymeric powder composition used according to the present invention comprises less than 5 wt-%, more preferably from 0.05 to 2 wt-%, particularly preferably from 0.05 to 1 wt-% of the total composition. Organic flow additives can also be used for the inventive compositions.

The thermosetting polymeric powder composition used according to the present invention preferably comprises at least one amorphous polymer binder, and maybe one or more (semi-) crystalline polymer powder binder, preferably from 0 to 49 wt-% of the total binder content, as an option, preferably together with other additives to adjust the melt viscosity of the system. Amorphous polymer binders are able to produce parts with very good dimensional accuracy, feature resolution and surface finish, depending on the grain size of the powder.

[Particle grain size] largely effects the precision and density of each 3D printed object. A smaller particle size is favorable for printing the 3D objects with a higher precision. On the other hand, a too small particle size of the polymeric powder composition will make it difficult to spread the powder because it causes the powder to self-reunite. Considering the cost of milling, the precision and the density of 3D objects, and the difficulty of spreading powder, a mean particle size of the thermosetting polymeric powder composition of 1 to 250 μm, preferably 20 to 100 μm, and more preferably 40 to 80 μm is chosen. In connection therewith it is also preferred if the curable polymeric binder material has at least two maxima in the particle size distribution, which maxima differentiate at least by a factor of 1.5, preferably by a factor of 2. Particle sizes potentially useful include sizes of D10=12-15 μm, D50=30-40 μm and D90=60-80 μm.

[Particle Shape] The sphericity of the powder particles has a large impact on the flow properties of the powder. In general, a higher sphericity of the powder particles results in better flow properties of the powder, which is important to obtain a smooth powder bed, and further simplifies the precise application of a thin powder layer after the printing/sintering process of a previous layer has been completed. Furthermore, the sphericity of the powder particles might influence the resolution and the density of the 3D thermosetting plastic objects and also the reusability of the employed powder.

Generally the sphericity (S) of a particle is defined as the ratio of a surface area (As) of a sphere of the same volume as the particle over the surface area of the particle (Ap). Hence S= As/Ap. However, as the surface area of the particle may be difficult to measure, in particular for a plurality of particles, sophisticated methods have been developed which are implemented in commercially available apparatuses, as for example Sysmex FPIA-3000, available from Malvern Instruments GmbH, Germany, www.malvern.com.

According to an embodiment, the average sphericity is defined by the averaging a circularity of the particles, wherein the circularity of a particle is determined by a circumference of a circle having an area that is equal to largest area enclosed by a perimeter of the particle divided by the perimeter.

According to an embodiment, the average sphericity is defined so as to include only a portion of the particles for calculating the average sphericity, in particular a portion of the particles which includes the largest particles of the coating material up to an amount of 80% of the overall coating material.

According to an embodiment, a sphericity of the particles is at least 0.7, in particular at least 0.8 and further in particular at least 0.9.

According to a further embodiment, the mean sphericity is between 0.90 and 0.97, preferably between 0.93 to 0.97.

The production process of the thermosetting polymeric powder composition used according to the present invention, mainly the milling process, requires resin (polymeric binder material) components with rather high softening temperatures. The glass transition and/or melting point (if a melting point exists) temperature of the polymeric binder materials used according to the present invention should preferably be above 40° C., otherwise the materials would fuse during the milling process or would need cryogenic milling. Selection of the polymeric binder material for the subject powder composition is preferably based on this requirement regarding the glass transition temperature and/or melting point. This property generally results in a relatively hard (brittle) partially cured printed 3D object so that it is necessary to fully cure the polymeric binder material effectively, in order to balance and provide for flexibility of the produced 3D object to optimum levels.

Agglomeration of the particles of the thermosetting polymeric powder composition used according to the present invention has to be avoided. The smaller the particles are, the higher the effects of surface energy are. If the particles are very small, agglomerates are more likely formed, which are no longer able to be fluidized resulting in the forming of specks and leveling defects in films produced.

The number average molecular weight ($M_n$) of the polymeric binder material used according to the present invention is preferably in the range of 1,000 to 15,000 Dalton, more preferably in the range of 1,500 to 7,500 Dalton. Mechanical properties of the curable polymeric binder material, such as flexibility and impact strength, are mostly dependent on the number average molecular weight ($M_n$), while viscosity is a function of the weight average molecular weight ($M_w$). To maximize the physical properties and retain a low melt viscosity, the polydispersity ($M_w/M_n$) should approach unity. The molecular weight of the curable polymeric binder material used according to the present invention will influence the $T_g$ and/or the $M_p$ (if a melting points exits) of the binder material. As already mentioned, the $T_g$ and/or the $M_p$ of the polymeric binder material used according to the present invention should be at least 40° C., preferably higher. The $T_g$ and/or $M_p$ must be high enough to resist sintering and agglomeration during—maybe cooled—storage and shipping of the powder, but low enough to promote maximum flow and leveling.

The present invention also comprises a 3D printing process, preferably a SLS process, in which the thermosetting polymeric powder composition mentioned in this description is used.

Preferably, in order to support fluidization of the thermosetting polymeric powder composition, both the fluidization of the powder when preparing the powder bed and during melting/softening, used according to the present invention, additives are added and/or, for example, the particle surfaces of the powder composition are covered with nano-particles. The composition used for 3D dry printing should have low melt viscosity, therefore polymeric ingredients of the powder composition used according to the present invention are preferably selected not only to have relatively high glass transition temperatures and/or melting points of above 40° C., but also to have low average molecular masses. Crystalline polymers can be added to the composition to optimize the melt viscosity because they have relatively sharp melting points and low melt viscosities.

The powder compositions used according to the present invention have only a short time after melting to coalesce and flow before crosslinking starts. Therefore, the melt viscosity, functionality and reaction rate of the polymeric binder material must be carefully controlled.

In the SLS process for instance, the powder bed is first pre-heated by the heating system to a temperature referred to as part bed temperature ($T_b$). Part distortion and laser power can be decreased by operating $T_b$ at the highest temperature possible, but not above the softening temperature points ($T_s$) of the polymers contained in the powder composition as used, otherwise polymer powders will stick together and be not freely flowable.

Within this invention the term "melting" or "melt" or any modification thereof is used for softening (at or above the $T_g$) in case of amorphous materials and/or the physical melting (at the $M_p$ or within the melting point range if no sharp $M_p$ exists) in case of (semi)crystalline materials. Amorphous polymers, as they are preferably used in the present invention as curable polymeric binder material, exhibit a glass transition temperature ($T_g$) below which they are solid, but no sharp melting point ($M_p$). Depending on their particle size and molecular weight, amorphous polymers are preheated to a temperature near $T_g$ and will then soften/and in case of (semi)crystalline materials melt if the temperature further rises above $T_g$ or $M_p$ during the 3D printing process. Above $T_g$, amorphous polymers first become leathery or rubbery and upon further temperature increases they turn liquid. In contrast, (semi)crystalline polymers display rather sharp melting points, whereby the $T_g$ of (semi)crystalline polymers is lower than $M_p$ in general, as can be determined with DSC measurements. According to an embodiment the powder bed temperature $T_b$ should be kept close to $T_g$ but should not be beyond $T_g$, otherwise the particles of amorphous polymer powders will stick together and distributing the powder will become difficult. According to another embodiment, the powder bed temperature $T_b$ can also be slightly higher than $T_g$.

In the SLS process, laser radiation, in particular $CO_2$ laser light with a wavelength of about 10.6 µm, is used to selectively sinter/melt the thermosetting polymeric powder composition, thereby converting the layer into a liquid. Under the heat produced by laser absorption, also the curing (crosslinking) reactions occur within the selected area, thus providing for an at least partial curing/crosslinking of this layer. In addition curing/crosslinking of the very same layer with/to the previously printed layer occurs, thereby still leaving a certain amount of functionalities unreacted in the very same layer for enabling curing/cross-linking of this layer with the next printed layer. Locally, full coalescence of the particles in the top powder layer is necessary, as well as adhesion (via curing/crosslinking reactions) to previously printed layers. Such localized curing can be optimized by carefully choosing processing conditions, thermoconductivity of the sample and the mixture of reactants. Preferably, a scanning system along with a preferably automated control of laser parameters is used, including control of laser power, pulse repetition rate, scanning frequency, scanning speed and size of laser beam. Regarding the thermosetting powder material used according to the present invention, the degree of curing (crosslinking) during formation of each layer can be for example controlled by the amount of curing agent present in the material, the resin to hardener ratio, the amount of catalyst, if any, present, the particle size distribution PSD as well as by the thickness of each printed layer. Providing for only a partial curing (cross-linking) when printing one layer leaves free functionalities, thus enabling curing/cross-linking of this layer with the immediately previously printed layer as well as with the next printed layer.

During each step of the 3D printing process, the mixture of the powdered thermosetting polymeric powder composition is applied to the target area in a range of thickness of preferably from 100 to 200 µm, more preferably 100 µm. Once the powder layer is leveled to form a smooth surface, depending on the 3D printing process used, it is exposed to a short burst of energy, for example in case of an SLS process exposed to radiation from a typically 5 watt (up to 200 watt) $CO_2$ laser with a wavelength of preferably 10.6 µm. The focused beam diameter is preferably between 400 to 700 µm to confine the heating of sample to a reasonably small region. When the energy of the laser is kept constant at eg. 50 watts, the intensity of the exposure can be controlled by varying the scan rate, which can be adjusted from 1 mm/s up to 12,000 mm/s, and which preferably is set between 2,000 to 6,000 mm/s at laser intensities in the rage of 100 to 800 J/cm$^3$.

If the laser, or generally the printing head and/or any other energy device, is scanned too quickly over the sample, curing may not be achieved at all because any one spot does not absorb sufficient energy to initiate curing. The other extreme is when the scanning speed is too low, then the spot would be overheated and the deposited energy would spread outward from the irradiated area, thus curing a greater area than desired. It is within the knowledge of a person skilled in the art to choose from the above mentioned parameters in a way to provide for a suitable degree of curing during formation of each layer as well as to leave free functionalities within the layer for curing/crosslinking with the previous and/or next layer.

In case of a 3D printing process involving the use of a laser beam and when working with a powder material which does not absorb laser energy as strongly, the absorption depth may exceed the depth of focus of the laser beam. For this case, it is likely that the depth of focus will be the factor which most determines the confinement of laser energy in the direction normal to the sample surface. Beyond the depth of focus, the laser energy would decrease sufficiently that curing would no longer be induced.

The laser spacing (hatch spacing) is usually less than the laser beam diameter. Cross-section of the molding may not be sintered if the laser spacing is too far, presently the laser spacing is normally in the range between 200 and 300 µm and preferred to be 200 µm. Each pass of laser causes the thermosetting polymeric powder composition to fuse and to initiate curing. With each successive pass of the laser beam, the film then formed is also first fused, simultaneously curing is initiated within the film, and additionally the film is also crosslinked with the film formed during the previous pass. This process is repeated layer by layer until the desired 3D object is completed.

Furthermore, the 3D thermosetting plastic objects produced according to the present invention can easily be coated with both powder coating materials and liquid coating materials. The powder coating can be applied onto the surface of printed 3D thermosetting plastic objects by a spraying process and may then be cured in an oven, for instance at about 170-180° C. for 10-20 min. The coating can be a functional coating such as a coating designed for weather protection, for outdoor use or for high chemical resistance. Moreover, coating materials useful to provide a specific surface design such as color coatings, matt coatings, gloss coatings or metallic effect coatings can be applied. Furthermore, by coating the 3D duropolast objects the roughness and the porosity of the surface finish will be reduced.

Of course it is also possible to print on the surface of 3D thermosetting plastic objects produced according to the present invention by using either inkjet processes or a toner, in particular a toner with a thermosetting material, more specifically a thermosetting material which can react with groups on the surface of 3D thermosetting plastic objects, and further in particular a toner material transfer via an transportable transfer element (e.g. transfer foil) (=indirect printing). By doing so, desirable optic and tactile effects, in particular haptic effects, can be achieved at the surface of printed 3D thermosetting plastic objects.

Post curing, that is an additional heat treatment step of the finished 3D object, might be necessary if the end use of printed parts requires high performance while the object is also required to possess high resolution and dimensional accuracy with complex detailed structures of the printed parts. It was found that by the process according to the present invention when using known 3D printing techniques, it is possible to obtain a curing degree of the finished 3D object of higher than 90%, such objects showing high mechanical strength, however only low resolution and low dimensional and/or geometric accuracy. When using post curing, that is an additional heat treatment step of the finished 3D object, printed parts with high strength, good performance and still high resolution and good dimensional accuracy can be obtained.

Post curing can for instance be performed in a programmable Thermoconcept KM 20/13 chamber oven. Best results without part deformation where obtained when using a temperature ramp from 50 to 140° C. with a rate of 5 to 10° C./h, then treatment may be continued at 140° C. for min 2 h (see example 7 to 9 below). Other post curing conditions and/or apparatus can also be used.

It is surprising that the by nature heat sensitive thermosetting polymeric powder composition used according to the present invention can be re-used principally with and also without mixing with fresh powder. The excess powder from the feed, the overflow containers and the excess powder from the powder bed after a completed printing process can be principally re-used. Reuse of thermoplastic powder is routinely done but the re-use of thermosetting powder is challenging as it is much more sensitive regarding elevated temperatures and processing. In order to confirm the possibility of re-using the thermosetting polymeric powder composition, the powder remaining in the feed and overflow containers after about a 30 hour build job (=printing process) was re-used without further modification, also without filtering. To round off the investigation, tensile bars produced with different parameters were tested. Additionally, a benchmark part was produced to check the resolution of the parts with the reused powder. The powder was collected from both feed containers, left and right from the build area, as well as from the overflow containers, situated in the left- and rightmost corners of the SLS DTM Sinterstation 2500 machine. The overflow containers were filled with powder left after layer deposition. This powder originates from the feed containers and since it has not been modified differently during the build job, has a similar thermal history. The composition of the powder after the printing process consisted of approximately 50% feed, and 50% overflow powder.

The parts (benchmark part and tensile bars) were built on a DTM Sinterstation 2500 commercial laser sintering machine and then post-cured in a Thermoconcept KM 20/13 chamber oven by heating them from room temperature to 140° C. with a heating rate of 10° C./hr. The parts then remained in the oven for another 5 hours at 140° C., afterwards the parts were cooled down to room temperature with a cooling rate of 10° C./min.

It was possible to print (build) parts with decent surface quality and good resolution and stable processing characteristics reusing the thermosetting polymeric powder composition used according to the present invention that was previously used for another printing process and stored for a longer period. The flowability of the powder was similar to fresh powder, and despite some small flaws on the edges of the powder bed, it was smooth throughout the build job. To be sure no agglomerates remain in the reused powder, it is recommended to sieve the used powder once before processing in the next build job. The tensile modulus and -strength of post-cured parts built with reused powder are reduced by 25% compared to parts from fresh powder. This is an indication the powder ages over time and with temperature. It is clear that a certain percentage of used powder (powder in feed containers, overflow containers and unsintered powder in powder bed chamber) can be sieved and mixed with fresh powder (from 20 to 80 wt %) and used on the machine for next build job, as is common for polyamide 12.

Test Methods:

The tensile properties (tensile strength, tensile modulus and elongation at break) were measured according to DIN EN ISO 527 on a Zwick/Roell Z100 universal testing machine equipped with a load cell of 5 kN. Crosshead speed was 1 mm/min for the determination of E Modulus, which was obtained by linear regression in the strain range between 0.1 and 0.25%. After reaching 0.25% strain, the crosshead speed was increased to 50 mm/min for the remainder of the test.

Differential Scanning calorimetry (DSC) measurements of the parts were performed with a Mettler-Toledo DSC 30 with sample weights between 7 and 10 mg. Samples were heated under nitrogen atmosphere from 25 to 300° C. with 20° C./min for the curing degree evaluation. The curing degree can be evaluated via the two most common means: 1) quantifying residual cure in the as-received material (in our case the printed part directly from the SLS machine) and 2) measuring the shift in the glass transition temperature. By knowing the heat of reaction of the 100% unreacted material, the curing degree of the sample can be calculated. Full curing can be measured by exothermic heat formation of DSC or by change in the glass transition $T_g$ (lower than 5% shift) over timer at a certain temperature.

Methods of measuring melting point ($M_p$):

According to the present invention, the melting point ($M_p$) of the polymers was determined by DSC measurements based on ISO 11357-3. The measurement was done using a heating rate of 20 K/min. The value stated in this invention for melting point refers to the Peak Melting Temperature stated in the standard.

Methods of measuring glass transition temperature ($T_g$):

According to the present invention, the glass transition temperature ($T_g$) of the polymers was determined by DSC measurements with a heating and cooling rate of 20 K/min. The measurements are based on ISO 11357-2 with some minor changes. The polymers were first heated from 25° C. to 80° C., the temperature hold for 1 minute, cooled to −20° C. and the temperature hold for 1 minute again. In a second step the polymers were heated to 130° C. which was used for determination of the $T_g$. The $T_g$ is determined by evaluating the point of inflection of the endothermal step.

Methods of measuring the number average molecular weight:

Semi-Crystalline Polyesters

The number average molecular weight of semi-crystalline polymeric binder materials is determined by gel permeation chromatography. As an eluent, chloroform was used at a flow rate of 1 ml/min. Calibration of the separation columns (three columns of 8 mm×300 mm each, PSS SDV, 5 μm, 100, 1000 and 100000 Å) was done by narrowly distributed polystyrene standards, and detection via refractive index detector.

Amorphous Polyesters

The number average molecular weight of amorphous polymeric binder materials is determined by gel permeation chromatography. As an eluent, tetrahydrofurane was used at a flow rate of 1 ml/min. Calibration of the separation columns (two columns 8 mm×300 mm each, PSS SDV, 5 μm, 1000 and 100000 Å) was done by narrowly distributed polystyrene standards, and detection via refractive index detector.

Particle size distribution of the powder was measured with laser diffraction technique using Mastersizer 2000 (Scirroco 2000).

EXAMPLES

Comparative Example 1

The mixture was composed of 600 parts of Uralac® P3490 (DSM) having $T_g$ of 69° C., a saturated carboxylated polyester resin, 45 parts of Araldite® PT-910 (Huntsman) having melting point (DSC, ISO 11357-1) 90-102° C., 320 parts of Titanium dioxide (Kronos® 2160, Kronos Titan GmbH), 15 parts of Resiflow PV 5 (Worlée-Chemie GmbH), 8 parts of Accelerator DT-3126 (Huntsman) having softening point of 100-110° C. and 7 parts of Benzoin having $M_p$ of 134° C. All components were premixed in a high-speed mixer for 1 min and then extruded in a twin-screw ZSK-18 extruder at a screw speed of 400 rpm with a rear-zone temperature of 80° C. and a front-zone temperature of 90° C. In an alternative setting of the extruder, a temperature gradient of 40 to 100° C. and a cooling device for the feeding area was used. The compound obtained was then cooled down, granulated and fine ground to obtain a powder having a D50 of less than 80 μm. The powder can be used in a 3D printer, for example in a SLS laser sintering 3D-printing machine.

Comparative Example 2

The mixture was composed of 600 parts of Uralac® P3490 having $T_g$ of 69° C., 45 parts of Araldite® PT-910 (Huntsman) having melting point (DSC, ISO 11357-1) 90-102° C., 15 parts of Resiflow PV 5 (Worlée-Chemie GmbH), 8 parts of Accelerator DT-3126 (Huntsman), 7 parts of Benzoin and 10 parts of short carbon fibers. The carbon fibers used had an average length of 60 μm and can be obtained under the product designation Tenax®-A HAT M100 (Toho Tenax Europe GmbH). All components were premixed in a high-speed mixer for 1 min and then extruded in a twin-screw ZSK-18 extruder at a screw speed of 400 rpm with a rear-zone temperature of 90° C. and a front-zone temperature of 100° C. In an alternative setting of the extruder, a temperature gradient of 40 to 100° C. and a cooling device for the feeding area was used. The compound obtained was then cooled down, granulated and fine ground to obtain a powder having a D50 of less than 100 μm. The powder can be used in a 3D printer, for example in a SLS laser sintering 3D-printing machine.

Comparative Example 3

The mixture was composed of 500 parts Uralac® P 1580 (DSM) having $T_g$ of about 51° C., a saturated OH-polyester resin, 215 parts of Vestagon® B 1530 (Evonik) having $T_g$ of about 48° C., 15 parts of Resiflow PV 5 (Worlée-Chemie GmbH) and 7 parts of Benzoin. All components were premixed in a high-speed mixer for 1 min and then extruded in a twin-screw ZSK-18 extruder at a screw speed of 400 rpm with a rear-zone temperature of 90° C. and a front-zone temperature of 100° C. In an alternative setting of the extruder, a temperature gradient of 40 to 100° C. and a cooling device for the feeding area was used. The compound obtained was then cooled down, granulated and fine ground to obtain a powder having a D50 of less than 100 μm. The powder can be used in a 3D printer, for example in a SLS laser sintering 3D-printing machine.

Comparative Example 4

The mixture was composed of 790 parts Uralac® P 6401 (DSM) having $T_g$ of 55° C., a saturated carboxylated polyester resin, 60 parts of TGIC PT 810(Huntsman) having melting point of 88-98° C., 15 parts of Resiflow PV 5 (Worlée-Chemie GmbH), 5 parts of Benzoin and 350 parts of Titanium dioxide (Kronos® 2160, Kronos Titan GmbH). All components were premixed in a high-speed mixer for 1 min and then extruded in a twin-screw ZSK-18 extruder at a screw speed of 400 rpm with a rear-zone temperature of 90° C. and a front-zone temperature of 100° C. In an alternative setting of the extruder, a temperature gradient of 40 to 100° C. and a cooling device for the feeding area was used. The compound obtained was then cooled down, granulated and fine ground to obtain a powder having a D50 of less than 100 μm. The powder can be used in a 3D printer, for example in a SLS laser sintering 3D-printing machine.

Comparative Example 5

The mixture was composed of 350 parts of Uralac® P 3450 (DSM), a saturated carboxylated polyester resin, 150 parts of Araldite® GT 7004 (Huntsman) having softening point of 95-101° C., 7 parts of Resiflow PV 5 (Worlée-Chemie GmbH), 4 parts of Benzoin and 230 parts of Titanium dioxide (Kronos® 2160, Kronos Titan GmbH). All components were premixed in a high-speed mixer for 1 min and then extruded in a twin-screw ZSK-18 extruder at a screw speed of 400 rpm with a rear-zone temperature of 90° C. and a front-zone temperature of 100° C. In an alternative setting of the extruder, a temperature gradient of 40 to 100° C. and a cooling device for the feeding area was used. The compound obtained was then cooled down, granulated and fine ground to obtain a powder having a D50 of less than 100 μm. The powder can be used in a 3D printer, for example in a SLS laser sintering 3D-printing machine.

Comparative Example 6

The mixture was composed of 350 parts of UVECOAT 2100 (Allnex) having $T_g$ of 57° C., an unsaturated polyester resin, 13 parts of photo initiators, 6 parts of MODAFLOW® Powder 6000, 2 parts of Benzoin. All components were premixed in a high-speed mixer for 1 min and then extruded in a twin-screw ZSK-18 extruder at a screw speed of 400 rpm with a rear-zone temperature of 90° C. and a front-zone temperature of 100° C. In an alternative setting of the extruder, zone temperatures of 40/60/80/100/90° C. and a cooling device for the feeding area was used. The compound obtained was then cooled down, granulated and fine ground to obtain a powder having a D50 of less than 80 μm. The powder can be used in a 3D printer, for example in a SLS laser sintering 3D-printing machine.

Comparative Example 7

The mixture was composed of 440 parts of Crylcoat 1506-6 (Allnex) having $T_g$ of 62° C., a saturated polyester resin, 290 parts of Araldite® GT7220 (Huntsman) having softening point of 95° C., 25 parts of Reafree C4705-10 (Arkema) having $T_g$ of 68° C., 10 parts of Eutomer B31 (Eutec Chemical), 15 parts of Powderadd 9083 (Lubrizol), 2 parts of Tinuvin 144 (BASF), 230 parts of Titan Tiona RCL 696 (Cristal). All components were premixed in a high-speed mixer for 1 min and then extruded in a twin-screw ZSK-18 extruder at a screw speed of 600 rpm with zone temperatures of 40/60/80/100/90° C. and a cooling device for the feeding area. The compound obtained was then cooled down, granulated and fine ground to obtain a powder having a D50 of less than 100 μm. The powder can be used in a 3D printer, for example in a SLS laser sintering 3D-printing machine.

Example 8

Composition Comprises Thermoplastic Material

The mixture was composed of 440 parts of Crylcoat 1506-6 (Allnex) having $T_g$ of 62° C., a saturated polyester resin, 290 parts of Araldite® GT7220 (Huntsman) having softening point of 95° C., 25 parts of Reafree C4705-10 (Arkema) having $T_g$ of 68° C., 10 parts of Eutomer B31 (Eutec Chemical), 15 parts of Powderadd 9083 (Lubrizol), 2 parts of Tinuvin 144 (BASF), 118 parts of Titan Tiona RCL 696 (Cristal), and 100 parts of thermoplastic (Staphyloid 3832), which are core-shell multilayer organic fine particles having $T_g$ of core is −40° C. and $T_g$ of shell is 100° C. All components were premixed in a high-speed mixer for 1 min and then extruded in a twin-screw ZSK-18 extruder at a screw speed of 600 rpm with zone temperatures of 40/60/80/100/90° C. and a cooling device for the feeding area. The compound obtained was then cooled down, granulated and fine ground to obtain a powder having a D50 of less than 100 μm. The powder can be used in a 3D printer, for example in a SLS laser sintering 3D-printing machine.

Comparative Example 9

Composition Comprises Whisker Fibers

The mixture was composed of 440 parts of Crylcoat 1506-6 (Allnex) having $T_g$ of 62° C., a saturated polyester resin, 290 parts of Araldite® GT7220 (Huntsman) having softening point of 95° C., 25 parts of Reafree C4705-10 (Arkema) having $T_g$ of 68° C., 10 parts of Eutomer B31 (Eutec Chemical), 15 parts of Powderadd 9083 (Lubrizol), 2 parts of Tinuvin 144 (BASF), 165 parts of Titan Tiona RCL 696 (Cristal), and with 50 parts of Si—C micron fibers (Si-TUFF, SC 210). All components were premixed in a high-speed mixer for 1 min and then extruded in a twin-screw ZSK-18 extruder at a screw speed of 600 rpm with zone temperatures of 40/60/80/100/90° C. and a cooling device for the feeding area. The compound obtained was then cooled down, granulated and fine ground to obtain a powder (reinforced with whisker fiber Si—C) having a D50 of less than 100 μm. The powder can be used in a 3D printer, for example in a SLS laser sintering 3D-printing machine.

Example 10

Production of Thermosetting 3D Parts by Using the SLS Process

The powders of examples 1-7 were used to produce 3D articles (FIG. 6) using a SLS process as following: Each of the powder of examples 1-7 was applied to the build surface stage in a DTM Sinterstation 2000 (DTM Corporation, Austin, Tex., USA). During each step of the SLS process, the powder of examples 1-7 were applied to the target area in a range of thickness of 100 μm. Once the powder layer has been leveled to form a smooth surface, it was exposed to radiation from a 10-30 W $CO_2$ laser with a wavelength of 10.6 μm at a scanning speed of about 2,500 to 5,000 mm/s, 2 to 4 scan counts and with a scan spacing of between 0.2 and 0.3 mm. The powder had a sufficient to good flowability, resulting in a smooth and leveled powder bed, where the part bed temperature was in the range from 50° C. to 80° C.; no curling occurred in this range.

The energy input required for the production of parts was between 10 and 40 W. The parts sintered at the highest energy input indicate satisfactory properties after SLS processing. As already mentioned, by varying the energy input the curing degree can be varied.

FIG. 7 demonstrates the results of printing three identical 3D parts using the powder composition according to the present invention, the parts having a total built height of 5.76 mm and being produced with the above-mentioned SLS DTM Sinterstation 2000 using three different process parameters:
  (a) the part was produced with an energy density of 25.2 kJ/m² (252 J/cm³), laser power 16 W, 2 scan counts, scanning speed 5,000 mm/s,
  (b) the part was produced with a higher energy density of 31.5 kJ/m² (315 J/cm³), laser power 10 W, 2 scan counts, scanning speed 2,500 mm/s and
  (c) the part was produced with an energy density of also 31.5 kJ/m² (315 J/cm³), laser power 10 W, but 4 scan counts, scanning speed 5,000 mm/s.

The parts thus built were strong enough to be sandblasted though, which allowed for easy removal of excess powder. Most delicate features survived this treatment. Parts (b) and (c) show better results with slits and holes being open, which is a key indicator for good part resolution. Increasing lateral growth in Z direction was observed. The surface of the part sintered at 2 scan counts×10 W at a low scanning speed 2,500 mm/s (b) was smoother and showed less errors than the part sintered at 4 scan counts×10 W at a high scanning speed 5,000 mm/s (c). The edges of the parts were quite round rather than sharp. With higher energy density obtained from process conditions of (b) and (c) the curing degree of the parts produced after SLS process reached about 47% while (a) reached only about 21% of curing degree calculated from DSC experiments.

It can be seen that by controlling the degree of curing (crosslinking) during formation of each layer only a partial curing (crosslinking) when printing one layer can be provided, which leaves free functionalities. Such free functionalities then enable a curing/crosslinking of this layer with the immediately previously printed layer and, once the next layer is printed, with this next printed layer.

Example 11

SLS Production of the Thermosetting 3D Parts Made Out of Powders Described in Example 8, Comparative Example 9 and the Comparative Example 7 and Their Mechanical Properties SLS build setup and parameters for examples 7, 8 and 9 are shown in Table 1.

The parts were built on a DTM Sinterstation 2000 commercial laser sintering machine. This build contained one multifunctional part for the evaluation of resolution, detailed structures, dimensional accuracy and smoothness of the printed part and ISO 527-1 tensile bars for mechanical properties. Both were sintered with process parameters using two different settings, namely set 1 and set 2 as listed in Table 1. Tensile properties were measured according to ISO 527-1 after a post-curing process as described above.

To balance powder bed caking with curling, the temperature profile was chosen such that the part bed temperature was 70° C. during sintering of the first few layers of the parts. The temperature then was gradually reduced to 67° C.

TABLE 1

Scanning parameters for parts in runs with set 1 and 2

| Set # [-] | Laser power [W] | Scan speed [mm/s] | Scan spacing [mm] | Scan count [-] | Layer thickness [mm] | Energy density [J/cm³] | Part bed temp [° C.] |
|---|---|---|---|---|---|---|---|
| 1 | 20 | 5000 | 0.3 | 2 | 0.1 | 267 | 70 |
| 2 | 20 | 5000 | 0.2 | 1 | 0.1 | 200 | 70 |

Parts printed using the composition of examples 7, 8 and 9 using set 1 and 2 parameters are shown in FIG. 8. Such parts are stable and can be sandblasted at low pressure, the surfaces are smooth. The contours of the parts are sharp and the resolution is good.

Interestingly it has been found that there are distinct differences between the surfaces of parts sintered when using the composition of example 8 with parameter sets 1 and 2. During sandblasting, a few thin parts of the top layer of the part built with parameter set 2 (single scan) were stripped away (FIG. 9). Also, fewer vertical walls were left standing. Both these observations indicate that the interlayer adhesion for these parts is much worse compared to the parts compared with parameter set 1 (double scans).

Despite some slight surface imperfections of the parameter set 2 parts (made using the compositions of example 8 and 9), all parts exhibited sharp contours and good resolution. The measured dimensional deviations were less than 5%. Parameter set 1 nonetheless seems to provide for both cases of example 8 and 9 an optimal mix between part accuracy and initial, pre-curing mechanical properties.

For the best performing parts from runs using set 1 and 2, an E-Modulus of approximately 1800 MPa is measured, as well as a tensile strength of almost 39 MPa. Typical values for PA12 published at TDS of DuraForm® PA Plastic are 1586 MPa and 43 MPa respectively and 14% elongation at break. Values published in U.S. Pat. No. 9,233,505 B2 are 1550 MPa and 46 MPa, respectively, and 12% for elongation at break. In terms of strength and stiffness, post-cured parts printed from the composition of example 7 are similar, or even better than PA12 parts. With only a few percent strain, the elongation at break of parts printed from the composition of example 7 however is relatively low, which is a typical characteristic of the cured thermoset system according to the present invention.

Therefore, thermoplastic modifiers and Si—C fibers were utilized when printing parts using the composition of example 8 and example 9, respectively, in order to improve the flexibility.

The average values of tensile properties and their associated standard deviations for of parts printed from the composition of examples 8 and comparative example 9 and comparative example 7 are shown in Table 2.

TABLE 2

Tensile properties of parts printed from the composition of example 8, 9 and comparative example 7

| Sample designation | E-Modulus [MPa] | Ultimate tensile strength [MPa] | Strain at break [%] |
|---|---|---|---|
| Example 7 set 1 | 1824 ± 148 | 38.8 ± 0.3 | 3.3 ± 0.01 |
| Example 7 set 2 | 1771 ± 134 | 34.7 ± 3.1 | 3.06 ± 0.3 |
| Example 8 set 1 | 1335 ± 20 | 31.6 ± 0.6 | 13.2 ± 1.9 |
| Example 8 set 2 | 1225 ± 53 | 28.0 ± 1.6 | 8.7 ± 1.2 |
| Example 9 set 1 | 2154 ± 25 | 43.6 ± 0.7 | 8.32 ± 0.6 |
| Example 9 set 2 | 2100 ± 33 | 40.7 ± 0.7 | 8.9 ± 1.29 |
| DuraForm ® PA | 1586 | 43 | 14 |

The addition of the thermoplastic modifier has a clear effect on the stiffness and strength of the material. A very clear difference was observed between the mechanical properties of parts printed from the composition of example 7 and parts printed from the composition of the thermoplastic modified example 8. Both E-Modulus and ultimate tensile strength are down for the modified material, while elongation at break is increased impressively from 3.3% for the neat material (example 7), to 13.2%, 4 times improvement for the modified material (example 8). This is a strong indication of the active effect of adding the thermoplastic polymer powder according to the present invention.

The difference in the resulting mechanical properties as an effect of chosen process parameters is somewhat larger for parts printed from the composition of example 8 than for using the composition of comparative example 7, especially when the strain at break is concerned.

The addition of the SiC fibers has overall positive effect on the stiffness and strength and flexibility of the material compared to parts printed from the composition of comparative example 7. The elongation at break shows the most drastic increase. Both E-Modulus and ultimate tensile strength were increased by roughly 15% for the reinforced material, though elongation at break increased impressively from 3.3% for the neat material, to 8.4% for the SiC modified material.

In summary, the scanning and temperature parameters chosen for printing the composition of comparative example 7 also proved suitable for printing the compositions of example 8 and example 9. The best parameter set was found to be the one with the highest energy density (267 J/cm³), also double scanning proved to be favorable in case of the compositions of examples 7 to 9. For these parts, both the best surface and mechanical properties were obtained.

A 12 hour printing process using the powder according to Example 8, modified by the addition of a thermoplastic compound (Staphyloid 3832) was completed on DTM Sinterstation 2500. A total of 11 demonstrator parts could be produced at once in the same powder bed chamber of the printing process. The process stability was excellent; the look and feel of the parts was outstanding. No caking occurred.

Example 12

Composition Comprising (Semi)Crystalline Polymer and Thermoplastic Material

The mixture was composed of 278 parts of "polyester 1", 295 parts of D.E.R 642U, 100 parts of Sirales PE 5900 (with $M_p$ of 110° C., meting range of 105-120° C.), 12 parts of Eutomer B31 (Eutec Chemical), 41 parts of Aradur 835, 10 parts of Modaflow P6000, 8 parts of Lanco TF 1778, and 130 parts of Ti-select, 50 parts of thermoplastic (Staphyloid 3832), which are core-shell multilayer organic fine particles (having a $T_g$ of the core of −40° C. and a $T_g$ of the shell of 100° C.) and 50 parts of wollastonite (Tremin VP 939-600 EST) and 31,4 parts of Omyacarb 1-SV. All components were premixed in a high-speed mixer for 1 min and then extruded in a twin-screw ZSK-18 extruder at a screw speed of 600 rpm with zone temperatures of 40/60/80/100/90° C. and a cooling device for the feeding area. The compound obtained was then cooled down, granulated and fine ground to obtain a powder having grain size of D10=12-15 µm, D50 =30-40 µm and D90=80 µm. The powder can be used in a 3D printer, for example in a SLS laser sintering 3D-printing machine.

"Polyester 1" is a carboxyl polyester having an acid number of 68-76 mg KOH/g and a viscosity of 2.0 to 3.5 Pa*s (measured at 200° C. with a Brookfield CAP 2000+ according to the Cone & Plate measuring method), which consists of terephthalic acid, adipic acid, neopentyl glycol, monoethylene glycol and trimellitic anhydride from the essential components and by melt polymerization at a temperature of up to 240° C.

Bars made out of the inventive composition of Example 12 were produced by SLS printing process with parameters of set 1 in Table 6. After printing they were post cured by heating 10° C./hr from 20° C. to 140° C., then kept at 140° C. for 5 h. Afterward the samples were cooling down 10° C./min to room temperature. The samples were very hard (hardness ca. 70 shore A), rigid at room temperature and not bendable.

Four bars printed out of a powder composition as given in Example 12 after postcuring with the same conditions described above were placed in 4 ovens held at different temperatures at 50° C., 80° C., 170° C. and 200° C. for 2 h, respectively. Then each bar was taken out from the oven and instantly tested as to its flexibility by bending manually by hand when the sample was still hot (FIG. 10).

It was observed that at 50° C. and 80° C. the specimens were bendable under force. That was also confirmed with heat deflection temperature (HDT) test at 1.8 MPa with obtained results at 50-52° C. The specimen had different degree of flexibility as a function of temperature. At higher temperature such as 170° C. and 200° C. the bars behaved very flexible like rubber. Interesting thing observed when comparing it to PA12 specimen at high temperature of about 200° C. ($T_m$ of PA12 about 181-185° C.), PA12 started to melt and lost its original printed form while the specimens printed of composition Example 12 still remained its form as come out from SLS process, and became very flexible at 200° C. It can be bended under force as in the picture and when it cooled down to room temperature it can go back to the original form or to the new form under applied force. The cross-linking process eliminates the risk of the product remelting when heat is applied, making thermosets ideal for high-heat applications such as electronics and appliances.

Without being bound by theory, the described effect could be explained by the fact of low crosslinking density in the cured/crosslinked thermoset system. A low degree of crosslinking results in flexible materials. In case of the composition from Example 12, the cured 3D thermosetting plastic object became very flexible at high temperature probably due the presence of the (semi)crystalline polymer and the core-shell thermoplastic material used in the composition.

Hardness:

The specimen was printed out of the powder composition described in Example 12 in a DTM Sinterstation 2500 with a laser density of 267 J/cm³ (laser power 20 W, scan speed 5000 mm/s, scan count 2, layer thickness of 0.1 mm) then further post cured at 140° C. for 5h. The hardness of the specimen measured according to ISO 868 was 69.2 shore D.

Water absorption:

The water absorption of the printed specimen was measured according to ASTM D570 (24h) after post curing and amounted to 0.25 wt-%.

Thermal expansion (ISO-11359):

The thermal expansion of a specimen printed with the composition according to Example 12 was measured according to ISO-11359 after post curing. The obtained value is 1.22 E-4 mean value change in length/° C. for the 1st heating and 1.64E-4 mean value change in length/° C. for the second heating with a heating rate of 20° C./min under nitrogen in a temperature range of between 25 and 100° C.

Mechanical properties:

Tensile and flexural properties after post curing

| Mechanical Properties | E-Modulus [MPa] | Ultimate strength [MPa] | Strain at break [%] |
|---|---|---|---|
| Tensile ISO 527-1, 23° C. | 1850 | 32 | 5.03 |
| Flexural ISO 178, 23° C. | 2324 | 65 | 4.96 |

The invention claimed is:

1. A 3D printing process comprising: depositing layers of a 3D printing composition in multiple passes with a 3D printer to produce a 3D duroplast, wherein the 3D printing composition is provided as a thermosetting polymeric powder composition comprising:
    at least one curable polymeric binder material in an amount of up to 98 wt % of the total composition; and
    at least one thermoplast, having a $T_g$ and/or $M_p$ below the temperature provided in each pass of the printing process, in an amount of between 1 and 30 wt % of the total composition; and wherein during each subsequent pass following the initial pass of the printing process, said at least one curable polymeric binder material is at least partially cured within the layer thus formed and also at least partially crosslinked with the previous layer.

2. The method according to claim 1, wherein at least one thermoplast present in the composition has functional groups able to react with the at least one curable polymeric binder material.

3. The method according to claim 1, wherein the at least one thermoplast is present in an amount of between 5 and 20 wt % of the total composition.

4. The method according to claim 1, wherein the composition further comprises at least one member of the group consisting of curing agent, catalyst, initiator, and mixtures thereof, which member is able to cure said at least one curable polymeric binder material.

5. The method according to claim 1, wherein the at least one curable polymeric binder material is curable by polyaddition, and/or polycondensation and/or radical polymerization.

6. The method according to claim 1, wherein the at least one curable polymeric binder material is selected from compounds with at least two epoxy functional groups, compounds with at least two carboxylic acid functional groups, compounds with at least two hydroxyl functional groups, compounds derived from acrylic acid or methacrylic acid and mixtures thereof.

7. The method according to claim 1, wherein the at least one curable polymeric binder material is present in an amount of from 10 to 70 wt % of the total composition.

8. The method according to claim 1, wherein at least one thermoplast present in the composition has a melting temperature of between 50° C. and 200° C.

9. The method according to claim 1, wherein at least one thermoplast present in the composition has a melt viscosity of 10 to 500 Pas when tested according to ISO 1133 at 160° C. using a 2.16 Kg load.

10. The method according to claim 1, wherein at least one thermoplast present in the composition is a pure amorphous thermoplastic material with a $T_g$ below 90° C.

11. The method according to claim 1, wherein at least one curable polymeric binder material present in the composition is an amorphous polymer binder.

12. The method according to claim 1, wherein the thermosetting polymeric powder composition has a particle size of 1 to 250 µm.

13. The method according to claim 1, wherein the glass transition temperature of the at least one curable polymeric binder material is at least 40° C.

14. The method according to claim 1, wherein the at least one curable polymeric binder material has a number average molecular weight of 1,000 to 15,000 D.

* * * * *

UNITED STATES PATENT AND TRADEMARK OFFICE
CERTIFICATE OF CORRECTION

PATENT NO. : 11,091,660 B2
APPLICATION NO. : 16/302406
DATED : August 17, 2021
INVENTOR(S) : Le-Huong Nguyen et al.

It is certified that error appears in the above-identified patent and that said Letters Patent is hereby corrected as shown below:

On the Title Page

Item (87) PCT Pub. Date:
Delete "Sep. 20, 2019" and replace with -- Sep. 20, 2018 --.

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*